US011479264B2

(12) United States Patent
Stenneth et al.

(10) Patent No.: US 11,479,264 B2
(45) Date of Patent: Oct. 25, 2022

(54) MOBILE ENTITY INTERACTION COUNTDOWN AND DISPLAY

(71) Applicant: HERE Global B.V., Eindhoven (NL)

(72) Inventors: Leon Stenneth, Chicago, IL (US); Jeremy Michael Young, Chicago, IL (US); Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 15 days.

(21) Appl. No.: 16/866,790

(22) Filed: May 5, 2020

(65) Prior Publication Data
US 2021/0347374 A1 Nov. 11, 2021

(51) Int. Cl.
B60W 50/14 (2020.01)
B60K 35/00 (2006.01)
G01C 21/36 (2006.01)
G01C 21/34 (2006.01)

(52) U.S. Cl.
CPC ............ B60W 50/14 (2013.01); B60K 35/00 (2013.01); G01C 21/3423 (2013.01); G01C 21/365 (2013.01); G01C 21/3655 (2013.01); B60K 2370/1868 (2019.05); B60K 2370/779 (2019.05); B60W 2050/146 (2013.01)

(58) Field of Classification Search
CPC .................................................... B60W 50/14
See application file for complete search history.

(56) References Cited

U.S. PATENT DOCUMENTS 7,586,400 B2 9/2009 Nagaoka et al.
7,734,500 B1* 6/2010 Allen ................... G07B 15/063
701/1
8,543,285 B2* 9/2013 Allen ................... G07B 15/063
705/13
8,924,139 B2 12/2014 Louis et al.
9,921,726 B1* 3/2018 Sculley .................... A47C 7/00
(Continued)

FOREIGN PATENT DOCUMENTS

EP 3251108 A1 * 12/2017 ............. G05D 1/102
WO WO 2019/030182 A2 2/2019

OTHER PUBLICATIONS

Stenneth, Leon, et al., "Transportation mode detection using mobile phones and GIS information", GIS '11: Proceedings of the 19th ACM SIG SPATIAL International Conference on Advances in Geographic Information Systems, Nov. 2011, pp. 54-63, Chicago, IL.

Primary Examiner — Jean Paul Cass
(74) Attorney, Agent, or Firm — Alston & Bird LLP

(57) ABSTRACT

Sensor data captured by one or more sensors coupled to a first entity are received by an apparatus. The sensor data comprises a location of the first entity or representation of surroundings of the first entity. Based at least in part on the sensor data, a second entity is identified. Based at least in part on trajectories along which the first and second entities are respectively traveling, it is expected that the second entity will enter a zone defined around the first entity. Based at least in part on the sensor data, an amount of time until the second entity will enter the zone is determined. The amount of time until the second entity will enter the zone is provided as (a) input to a navigation function and/or (b) to be displayed as a countdown via a display element and/or speaker element of the first entity.

20 Claims, 9 Drawing Sheets

(56) References Cited

U.S. PATENT DOCUMENTS

| | | | |
|---|---|---|---|
| 10,300,846 B2* | 5/2019 | Suzuki | B60Q 1/04 |
| 10,513,268 B2 | 12/2019 | Ryne et al. | |
| 10,867,210 B2* | 12/2020 | Mao | G06K 9/628 |
| 2009/0174575 A1* | 7/2009 | Allen | G08G 1/017 |
| | | | 340/933 |
| 2009/0239577 A1* | 9/2009 | Holton | H04M 1/72412 |
| | | | 455/556.1 |
| 2014/0309804 A1* | 10/2014 | Ricci | G06F 3/0637 |
| | | | 701/1 |
| 2015/0061895 A1* | 3/2015 | Ricci | B60K 28/00 |
| | | | 340/902 |
| 2016/0140649 A1* | 5/2016 | Kleve | H04W 12/06 |
| | | | 705/307 |
| 2016/0217333 A1 | 7/2016 | Ozawa et al. | |
| 2016/0291149 A1* | 10/2016 | Zeng | G01S 13/931 |
| 2017/0036776 A1* | 2/2017 | He | G08G 5/025 |
| 2018/0267794 A1* | 9/2018 | Atchison | F24F 11/32 |
| 2019/0102825 A1* | 4/2019 | Jaber | H04W 4/33 |
| 2019/0204827 A1* | 7/2019 | Bhalla | B60W 50/14 |
| 2019/0206247 A1* | 7/2019 | Xie | G06N 5/046 |
| 2019/0217735 A1* | 7/2019 | Donnelly | G05D 1/0088 |
| 2021/0215486 A1* | 7/2021 | Percy | G01C 21/203 |

\* cited by examiner

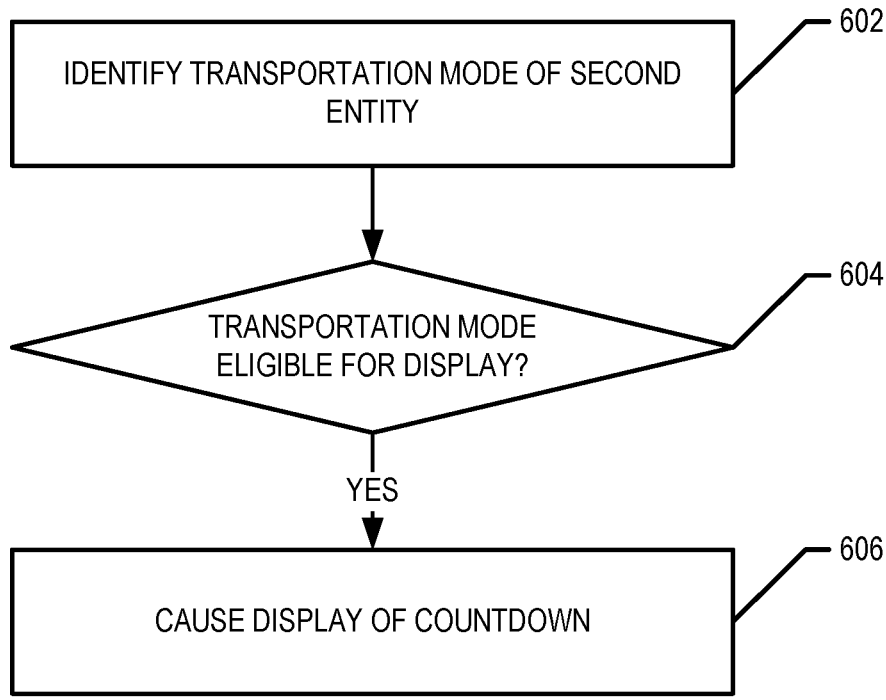
FIG. 6
FIG. 7
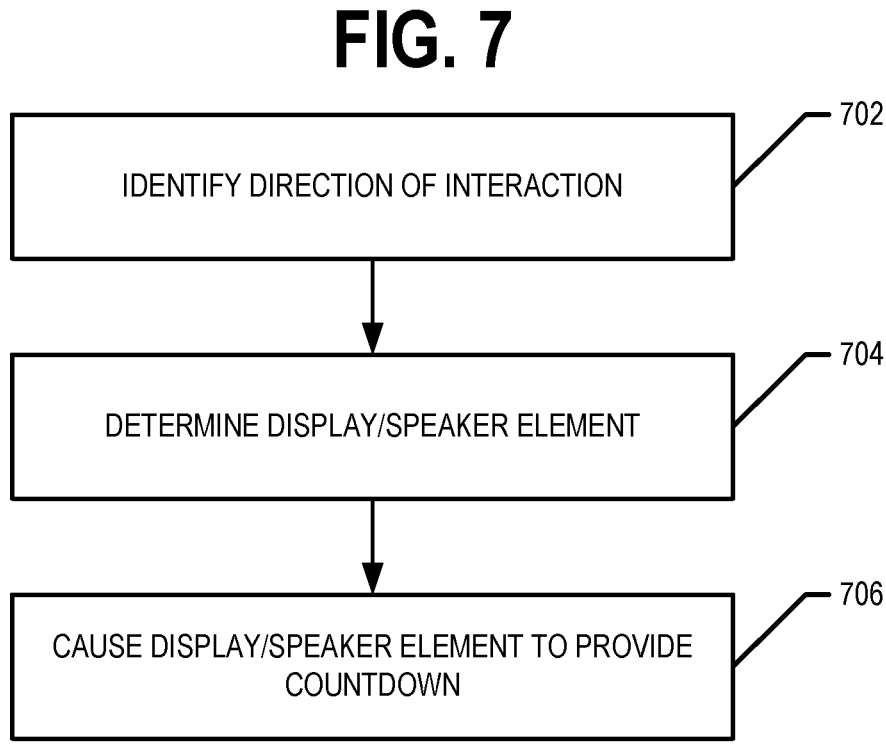

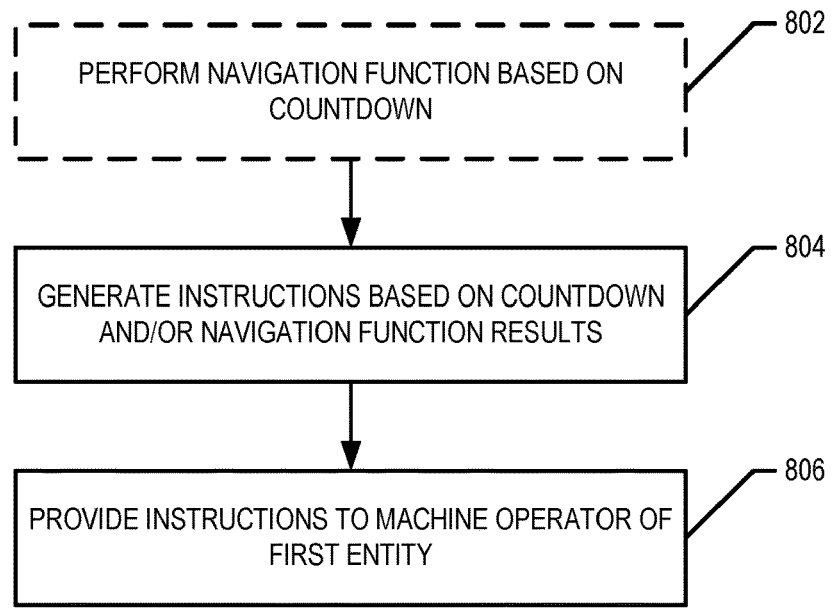
FIG. 8
FIG. 9
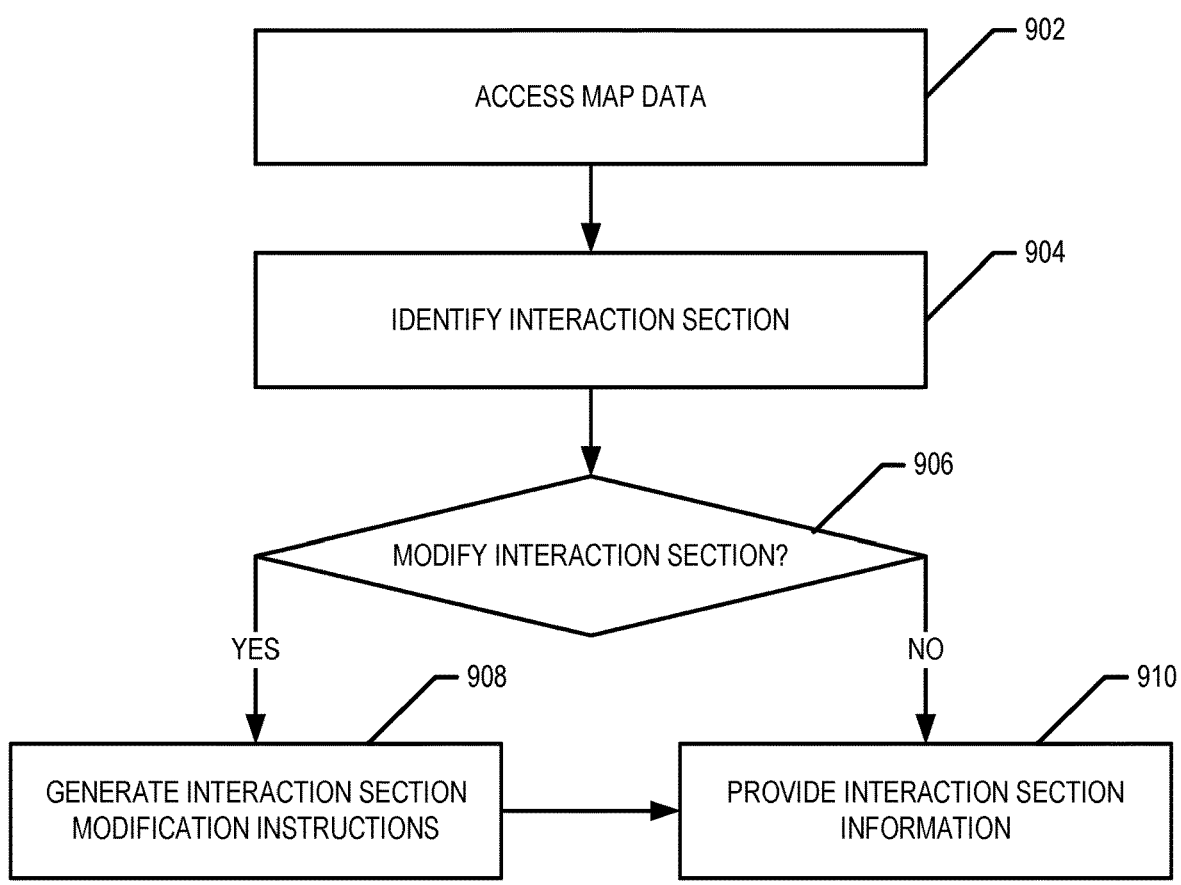

MOBILE ENTITY INTERACTION COUNTDOWN AND DISPLAY

TECHNOLOGICAL FIELD

An example embodiment relates generally to providing a countdown to a time when two mobile entities are expected to interact. An example embodiment relates generally to the display of a countdown until the time when two mobile entities are expected to interact.

BACKGROUND

When operating a vehicle, it can be difficult to anticipate when an object will be within close vicinity. There are many types of objects on the roads, especially in urban environments, that could come from multiple directions. For example, another vehicle or a truck may come from behind a vehicle, a pedestrian may be crossing the roadway, and the vehicle may come up on a bicycle. This can cause difficulties in controlling a vehicle for both human operators and automated driving and/or driving assistance systems.

BRIEF SUMMARY OF SOME EXAMPLE EMBODIMENTS

Various embodiments provide a technical solution to the technical problem of providing human and machine operators (e.g., an autonomous driving system or an autonomous driver assistance system (ADAS)) of a first entity (e.g., a vehicle) with information/data regarding when one or more second entities is expected to interact with the first entity. In various embodiments, the second entities may be pedestrians, bicycles, other vehicles (e.g., cars, vans, pickup trucks, boats, personal watercraft, and/or the like), tractor trailers, busses, and/or the like. In various embodiments, a second entity may interact with the first entity by entering a zone around the first entity. In various embodiments, the zone around the first entity may be defined as circle or ellipse having a defined radius and centered around the first entity, a polygon or closed curve of another shape that extends some distance from the surface of the first entity, and/or the like. In various embodiments, the information/data regarding when the one or more second entities are expected to interact with the first entity may be provided as countdowns until the respective points in time when the second entities are respectively expected to interact with the first entity. The countdowns may be provided to a human operator and/or passenger onboard the first entity (e.g., displayed and/or audibly provided) or provided for use in controlling the first entity and/or performing a navigation function corresponding to the first entity.

Various embodiments provide methods, apparatus, systems, computer program products and/or the like configured for determining respective expected points in time when corresponding interactions between second entities in proximity with the first entity and the first entity are expected to begin, and provide corresponding countdowns until the respective points in time for use by a human operator of the first entity or a machine operator (e.g., autonomous driving system or ADAS) of the first entity. In various embodiments, the first entity is a vehicle or other mode of transportation (e.g., pedestrian, bicycle, passenger vehicle, car, van, pickup truck, tractor trailer, commercial vehicle, bus, boat, personal watercraft, and/or the like). A first entity apparatus is onboard the first entity and may include and/or be coupled to an autonomous driving system and/or ADAS configured for controlling, at least in part and/or under certain circumstances, the first entity.

In various embodiments, a countdown corresponding to and/or providing an expected time when a second entity is expected to interact with the first entity may be displayed, haptic or audibly provided for a human operator and/or human passenger onboard the first entity to view or hear or feel. In an example embodiment, the countdown may be displayed or audibly provided in a manner that indicates a mode of transportation corresponding to the second entity (e.g., pedestrian, bicycle, vehicle, tractor trailer/truck, bus, and/or the like). In an example embodiment, the countdown may be displayed or audibly provided in a manner that indicates the direction from which the second entity is approaching the first entity. For example, the first entity may comprise one or more display elements and/or speaker elements. The one or more display elements may include the windshield of the vehicle, an in-vehicle display, a driver side front window, a passenger side front window, a driver side side-view mirror, a passenger side side-view mirror, a rear view mirror, a dashboard display element, mobile device such as a phone onboard the first entity (e.g., that is held by the operator or passenger), and/or the like. In an example embodiment, the first entity is in communication with a heads-up display worn by a human operator and/or passenger onboard the first entity and the heads-up display may be used as a display element. The first entity may comprise one or more speaker elements, such as speakers located in the back of the first entity, front of the first entity, passenger side, and/or driver side. In an example embodiment, the first entity is in communication with a headset, headphones, or earbuds worn by a human operator and/or passenger onboard the first entity and the headset, headphones, or earbuds may be used a speaker element.

In various embodiments, the countdown corresponding to and/or providing an expected time when a second entity is expected to interact with the first entity may be provided to a machine operator of the first entity (e.g., an autonomous driving system and/or ADAS) for use by the machine operator in preventing or changing the interaction of the second entity with the first entity. In various embodiments, the countdown corresponding to and/or providing an expected time (this could be near real time or at a future predicted time) when a second entity is expected to interact with the first entity may be provided as input for the performance of a navigation function. Some non-limiting examples of navigation functions include route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control and/or guidance, route and/or maneuver visualization, identifying an interaction section and/or modifications thereto, and/or the like.

In an example embodiment, sensor data captured by one or more sensors associated with at least a first entity is received by a processor of an apparatus (e.g., a remote apparatus and/or a first entity apparatus). The sensor data comprises to at least one of a location of the first entity or a representation of the surroundings of the first entity. The apparatus identifies, based at least in part on the sensor data, at least one second entity. Based at least in part on a first trajectory along which the first entity is traveling and a second trajectory along which the at least one second entity is traveling, it is expected that the at least one second entity will enter a zone defined around the first entity. The apparatus determines, based at least in part on the sensor data, an amount of time until the at least one second entity will enter the zone. The apparatus provides the amount of time until the at least one second entity will enter the zone as (a) input to a navigation function and/or (b) to be displayed as a countdown via a display element and/or speaker element of the first entity.

According to an aspect of the present disclosure, a method for providing an amount of time until an interaction between a first entity and second entity is expected to begin. In an example embodiment, the method comprises receiving, by a processor of an apparatus, sensor data captured by one or more sensors associated with at least a first entity. The sensor data comprises at least one of a location of the first entity or a representation of the surroundings of the first entity. The method further comprises identifying, by the processor and based at least in part on the sensor data, at least one second entity. Based at least in part on a first trajectory along which the first entity is traveling and a second trajectory along which the at least one second entity is traveling, it is expected that the at least one second entity will enter a zone defined around the first entity. the method further comprises determining, by the processor and based at least in part on the sensor data, an amount of time until the at least one second entity will enter the zone; and providing, by the processor, the amount of time until the at least one second entity will enter the zone as at least one of (a) input to a navigation function or (b) to be displayed as a countdown via a display element and/or speaker element of the first entity.

In an example embodiment, the method further comprises identifying a transportation mode associated with the at least one second entity; determining, based on profile information associated with at least one of the first entity or a human operator or passenger onboard the first entity, whether a countdown is to be displayed for second entities of the transportation mode; and responsive to determining that the countdown is to be displayed, causing the countdown to be displayed. In an example embodiment, the method further comprises identifying a transportation mode associated with the at least one second entity; and causing a transportation mode symbol indicating the transportation mode to be displayed in association with the countdown. In an example embodiment, the method further comprises identifying the display element and/or speaker element of the first entity based on at least one of (a) a location of the at least one second entity with respect to the first entity or (b) profile information associated with at least one of the first entity or a human operator or passenger onboard the first entity. In an example embodiment, the display element is one of a rear view mirror of the first entity, a driver's side mirror of the first entity, a passenger side mirror of the first entity, a windshield of the first entity, an in-vehicle display of the first entity, a dashboard display element of the first entity, a wearable heads up display worn by a human operator or passenger onboard the first entity. In an example embodiment, the method further comprises updating the amount of time until the at least one second entity will enter the zone based at least in part on additional sensor data, the additional sensor data corresponding to an updated location of the first entity or updated surroundings of the first entity; and providing the updated amount of time until the at least one second entity will enter the zone.

In an example embodiment, the at least one second entity comprises two or more second entities and a number of countdowns provided via one or more display elements and/or speak elements of the first entity is determined based on profile information associated with at least one of the first entity or a human operator or passenger onboard the first entity, each countdown of the number of countdowns corresponding to one second entity of the two or more second entities. In an example embodiment, the number of countdowns provided correspond to second entities of the two or more second entities having shortest times until the second entity enters the zone. In an example embodiment, the method further comprises identifying a transportation mode associated with each of the two or more second entities; determining, based on profile information associated with at least one of the first entity or a human operator or passenger onboard the first entity, whether each second entity of the two or more second entities are eligible for a countdown based on the corresponding transportation mode; and providing the amount of time until the second entity enters the zone for a number of second entities that are eligible for a countdown that have shortest times until the second entity enters the zone. In an example embodiment, the method further comprises determining whether the time until the second entity enters the zone satisfies a time threshold requirement, wherein display of the countdown is caused responsive to determining that the time until the second entity enters the zone satisfies the time threshold requirement.

In an example embodiment, a result of the navigation function comprises instructions for an automated driver assistance system or an automated driving system. In an example embodiment, the method further comprises, based at least in part on map data and the time until the at least one second entity enters the zone, determining an interaction section of at least portions of one or more traversable map elements path along which it is expected that the at least one second entity will enter the zone. In an example embodiment, the method further comprises, based on map data corresponding to the interaction section, determining whether to modify the operation of the first entity so that the at least one second entity enters the zone in a modified interaction zone. In an example embodiment, the method further comprises generating and providing or causing the providing of interaction section modification instructions, wherein operation of the first entity in accordance with the interaction section modification instructions is expected to cause the at least one second entity to enter the zone in the modified interaction zone.

According to another aspect of the present invention, an apparatus is provided. In an example embodiment, the apparatus comprises at least one processor and at least one memory storing computer program code. The at least one memory and the computer program code are configured to, with the processor, cause the apparatus to at least receive sensor data captured by one or more sensors associated with at least a first entity. The sensor data comprises at least one of a location of the first entity or a representation of surroundings of the first entity. The at least one memory and the computer program code are further configured to, with the processor, cause the apparatus to at least identify, based at least in part on the sensor data, at least one second entity, wherein, based at least in part on a first trajectory along which the first entity is traveling and a second trajectory along which the at least one second entity is traveling, it is expected that the at least one second entity will enter a zone defined around the first entity; determine, based at least in part on the sensor data, an amount of time until the at least one second entity will enter the zone; and provide the amount of time until the at least one second entity will enter the zone as at least one of (a) input to a navigation function or (b) to be displayed as a countdown via a display element and/or speaker element of the first entity.

In an example embodiment, the at least one memory and the computer program code are further configured to, with the processor, cause the apparatus to at least identify a transportation mode associated with the at least one second entity; determine, based on profile information associated with at least one of the first entity or a human operator or passenger onboard the first entity, whether a countdown is to be displayed for second entities of the transportation mode; and responsive to determining that the countdown is to be displayed, cause the countdown to be displayed. In an example embodiment, the at least one memory and the computer program code are further configured to, with the processor, cause the apparatus to at least identify a transportation mode associated with the at least one second entity; and cause a transportation mode symbol indicating the transportation mode to be displayed in association with the countdown. In an example embodiment, the at least one memory and the computer program code are further configured to, with the processor, cause the apparatus to at least identify the display element and/or speaker element of the first entity based on at least one of (a) a location of the at least one second entity with respect to the first entity or (b) profile information associated with at least one of the first entity or a human operator or passenger onboard the first entity. In an example embodiment, the display element is one of a rear view mirror of the first entity, a driver's side mirror of the first entity, a passenger side mirror of the first entity, a windshield of the first entity, an in-vehicle display of the first entity, a dashboard display element of the first entity, a wearable heads up display worn by a human operator or passenger onboard the first entity. In an example embodiment, the at least one memory and the computer program code are further configured to, with the processor, cause the apparatus to at least update the amount of time until the at least one second entity will enter the zone based at least in part on additional sensor data, the additional sensor data corresponding to an updated location of the first entity or updated surroundings of the first entity; and provide the updated amount of time until the at least one second entity will enter the zone.

In an example embodiment, the at least one second entity comprises two or more second entities and a number of countdowns provided via one or more display elements and/or speak elements of the first entity is determined based on profile information associated with at least one of the first entity or a human operator or passenger onboard the first entity, each countdown of the number of countdowns corresponding to one second entity of the two or more second entities. In an example embodiment, the number of countdowns provided correspond to second entities of the two or more second entities having shortest times until the second entity enters the zone. In an example embodiment, the at least one memory and the computer program code are further configured to, with the processor, cause the apparatus to at least identify a transportation mode associated with each of the two or more second entities; determine, based on profile information associated with at least one of the first entity or a human operator or passenger onboard the first entity, whether each second entity of the two or more second entities are eligible for a countdown based on the corresponding transportation mode; and provide the amount of time until the second entity enters the zone for a number of second entities that are eligible for a countdown that have shortest times until the second entity enters the zone. In an example embodiment, the at least one memory and the computer program code are further configured to, with the processor, cause the apparatus to at least determine whether the time until the second entity enters the zone satisfies a time threshold requirement, wherein display of the countdown is caused responsive to determining that the time until the second entity enters the zone satisfies the time threshold requirement.

In an example embodiment, a result of the navigation function comprises instructions for an automated driver assistance system or an automated driving system. In an example embodiment, the at least one memory and the computer program code are further configured to, with the processor, cause the apparatus to at least, based at least in part on map data and the time until the at least one second entity enters the zone, determine an interaction section of at least portions of one or more traversable map elements path along which it is expected that the at least one second entity will enter the zone. In an example embodiment, the at least one memory and the computer program code are further configured to, with the processor, cause the apparatus to at least, based on map data corresponding to the interaction section, determine whether to modify the operation of the first entity so that the at least one second entity enters the zone in a modified interaction zone. In an example embodiment, the at least one memory and the computer program code are further configured to, with the processor, cause the apparatus to at least generate and provide or cause the providing of interaction section modification instructions, wherein operation of the first entity in accordance with the interaction section modification instructions is expected to cause the at least one second entity to enter the zone in the modified interaction zone.

In still another aspect of the present invention, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive sensor data captured by one or more sensors associated with at least a first entity. The sensor data comprises at least one of a location of the first entity or a representation of surroundings of the first entity. The computer-readable program code portions further comprise executable portions configured, when executed by a processor of an apparatus, to cause the apparatus to identify, based at least in part on the sensor data, at least one second entity, wherein, based at least in part on a first trajectory along which the first entity is traveling and a second trajectory along which the at least one second entity is traveling, it is expected that the at least one second entity will enter a zone defined around the first entity; determine, based at least in part on the sensor data, an amount of time until the at least one second entity will enter the zone; and provide the amount of time until the at least one second entity will enter the zone as at least one of (a) input to a navigation function or (b) to be displayed as a countdown via a display element and/or speaker element of the first entity.

In an example embodiment, the computer-readable program code portions further comprise executable portions configured, when executed by a processor of an apparatus, to cause the apparatus to identify a transportation mode associated with the at least one second entity; determine, based on profile information associated with at least one of the first entity or a human operator or passenger onboard the first entity, whether a countdown is to be displayed for second entities of the transportation mode; and responsive to determining that the countdown is to be displayed, cause the countdown to be displayed. In an example embodiment, the computer-readable program code portions further comprise executable portions configured, when executed by a processor of an apparatus, to cause the apparatus to identify a transportation mode associated with the at least one second entity; and cause a transportation mode symbol indicating the transportation mode to be displayed in association with the countdown. In an example embodiment, the computer-readable program code portions further comprise executable portions configured, when executed by a processor of an apparatus, to cause the apparatus to identify the display element and/or speaker element of the first entity based on at least one of (a) a location of the at least one second entity with respect to the first entity or (b) profile information associated with at least one of the first entity or a human operator or passenger onboard the first entity. In an example embodiment, the display element is one of a rear view mirror of the first entity, a driver's side mirror of the first entity, a passenger side mirror of the first entity, a windshield of the first entity, an in-vehicle display of the first entity, a dashboard display element of the first entity, a wearable heads up display worn by a human operator or passenger onboard the first entity. In an example embodiment, the computer-readable program code portions further comprise executable portions configured, when executed by a processor of an apparatus, to cause the apparatus to update the amount of time until the at least one second entity will enter the zone based at least in part on additional sensor data, the additional sensor data corresponding to an updated location of the first entity or updated surroundings of the first entity; and provide the updated amount of time until the at least one second entity will enter the zone.

In an example embodiment, the at least one second entity comprises two or more second entities and a number of countdowns provided via one or more display elements and/or speak elements of the first entity is determined based on profile information associated with at least one of the first entity or a human operator or passenger onboard the first entity, each countdown of the number of countdowns corresponding to one second entity of the two or more second entities. In an example embodiment, the number of countdowns provided correspond to second entities of the two or more second entities having shortest times until the second entity enters the zone. In an example embodiment, the computer-readable program code portions further comprise executable portions configured, when executed by a processor of an apparatus, to cause the apparatus to identify a transportation mode associated with each of the two or more second entities; determine, based on profile information associated with at least one of the first entity or a human operator or passenger onboard the first entity, whether each second entity of the two or more second entities are eligible for a countdown based on the corresponding transportation mode; and provide the amount of time until the second entity enters the zone for a number of second entities that are eligible for a countdown that have shortest times until the second entity enters the zone. In an example embodiment, the computer-readable program code portions further comprise executable portions configured, when executed by a processor of an apparatus, to cause the apparatus to determine whether the time until the second entity enters the zone satisfies a time threshold requirement, wherein display of the countdown is caused responsive to determining that the time until the second entity enters the zone satisfies the time threshold requirement.

In an example embodiment, a result of the navigation function comprises instructions for an automated driver assistance system or an automated driving system. In an example embodiment, the computer-readable program code portions further comprise executable portions configured, when executed by a processor of an apparatus, to cause the apparatus to, based at least in part on map data and the time until the at least one second entity enters the zone, determine an interaction section of at least portions of one or more traversable map elements path along which it is expected that the at least one second entity will enter the zone or come within a threshold of distance from the borders or centroid of the zone. In an example embodiment, the computer-readable program code portions further comprise executable portions configured, when executed by a processor of an apparatus, to cause the apparatus to, based on map data corresponding to the interaction section, determine whether to modify the operation of the first entity so that the at least one second entity enters the zone in a modified interaction zone. In an example embodiment, the computer-readable program code portions further comprise executable portions configured, when executed by a processor of an apparatus, to cause the apparatus to generate and provide or cause the providing of interaction section modification instructions, wherein operation of the first entity in accordance with the interaction section modification instructions is expected to cause the at least one second entity to enter the zone in the modified interaction zone.

According to yet another aspect, an apparatus is provided. In an example embodiment, the apparatus comprises means for receiving sensor data captured by one or more sensors associated with at least a first entity. The sensor data comprises at least one of a location of the first entity or a representation of the surroundings of the first entity. The apparatus comprises means for identifying, based at least in part on the sensor data, at least one second entity. Based at least in part on a first trajectory along which the first entity is traveling and a second trajectory along which the at least one second entity is traveling, it is expected that the at least one second entity will enter a zone defined around the first entity. The apparatus comprises means for determining, based at least in part on the sensor data, an amount of time until the at least one second entity will enter the zone. The apparatus comprises means for providing the amount of time until the at least one second entity will enter the zone as at least one of (a) input to a navigation function or (b) to be displayed as a countdown via a display element and/or speaker element of the first entity.

BRIEF DESCRIPTION OF THE DRAWINGS

Figure 1A:
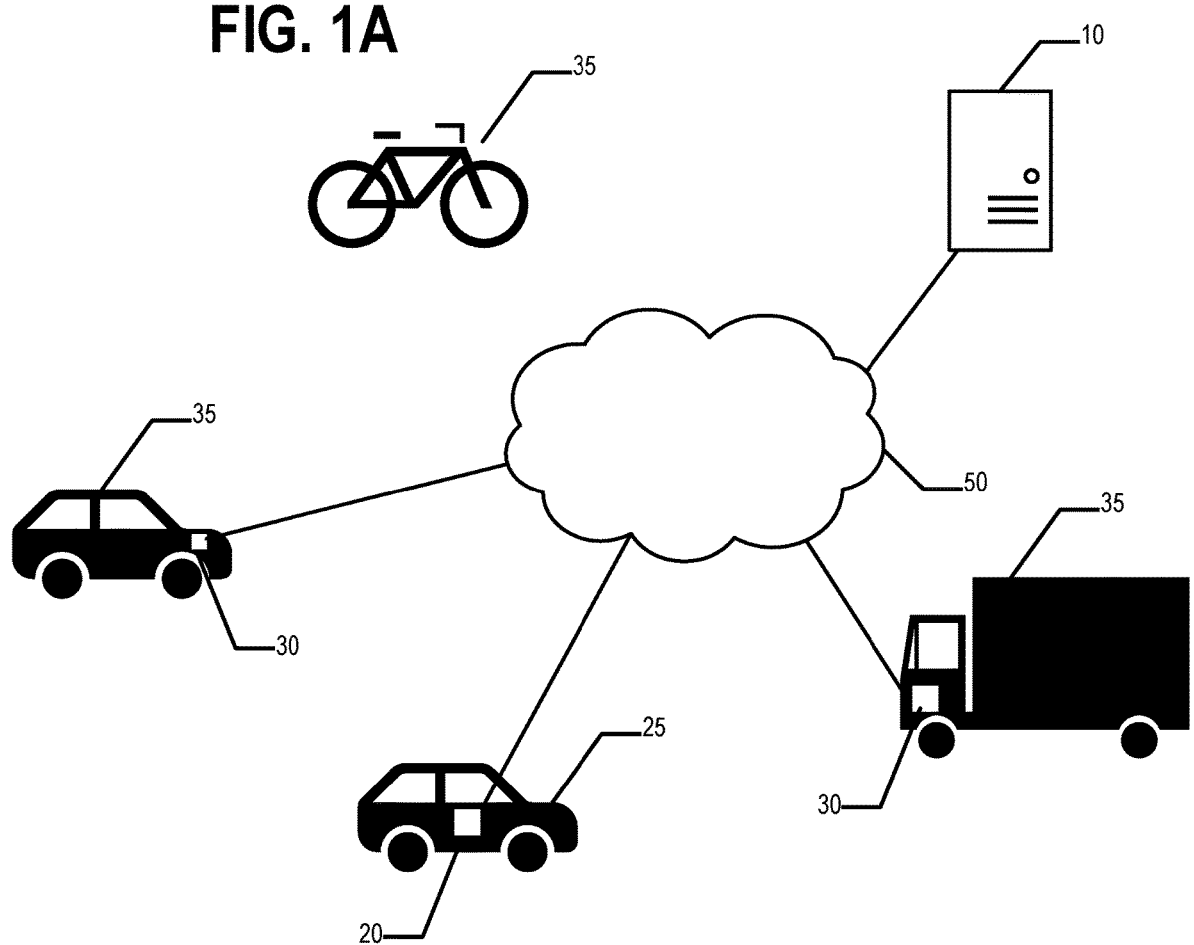
Figure 1B:
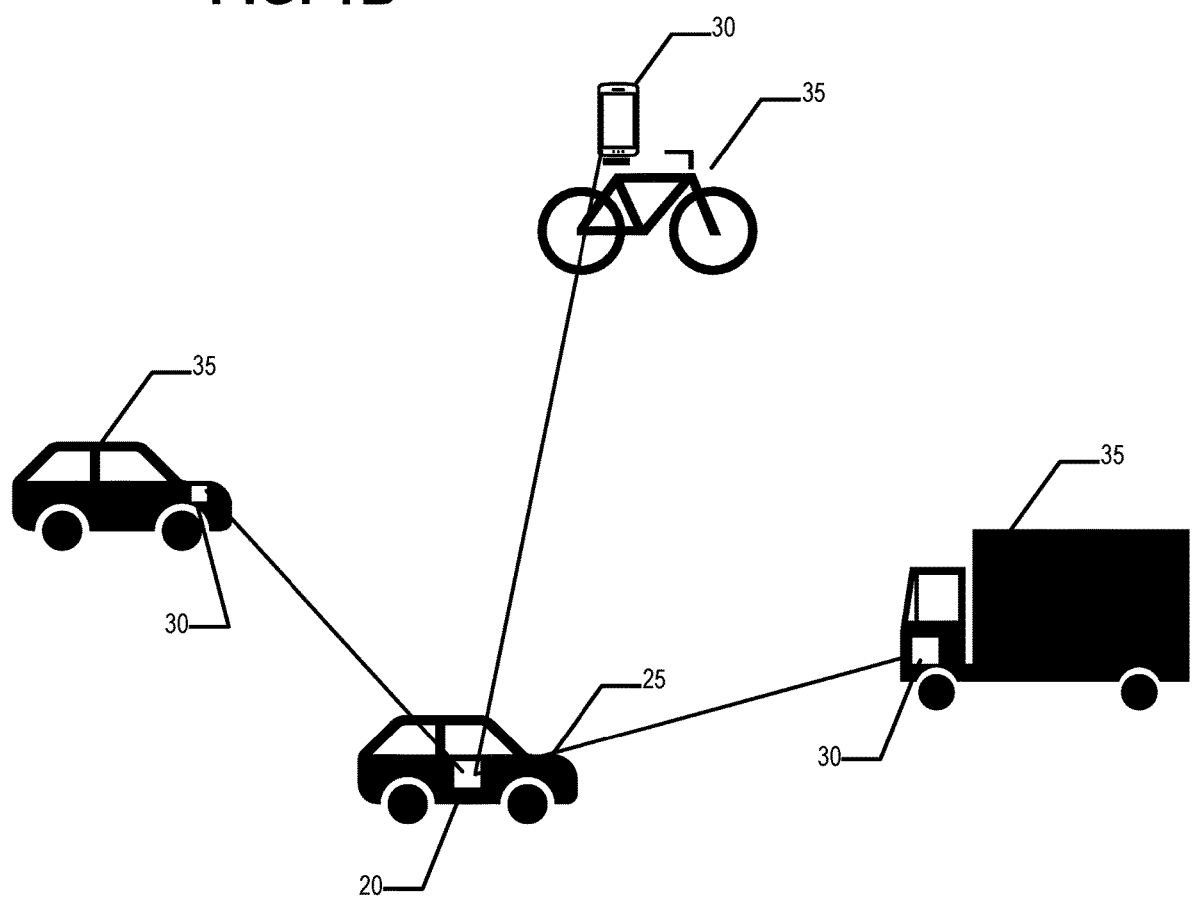
Figure 2A:
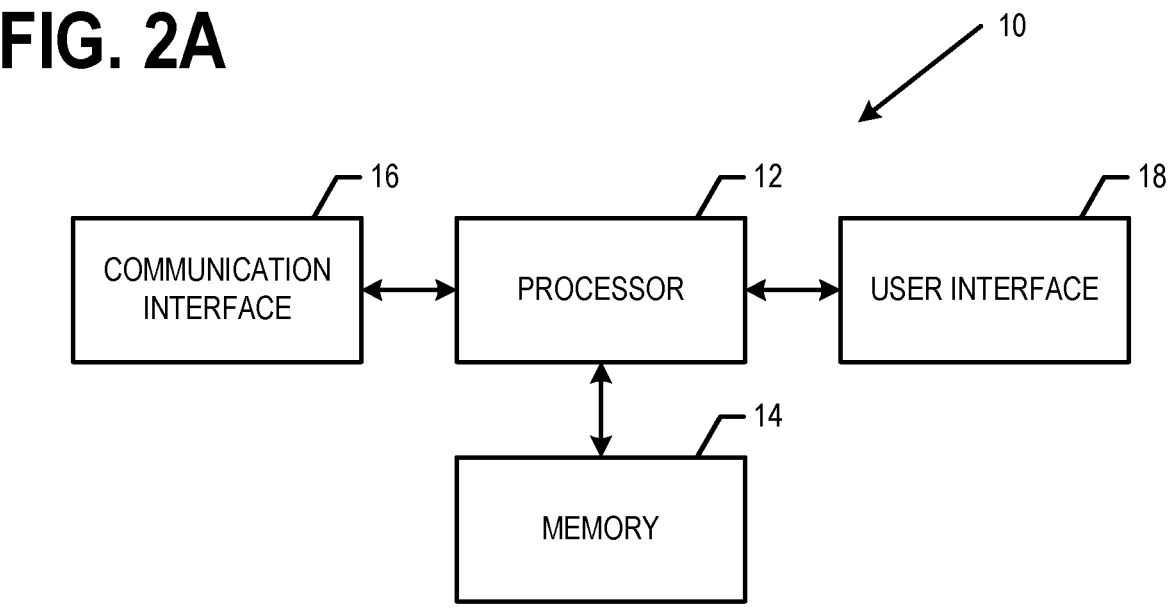
Figure 2B:
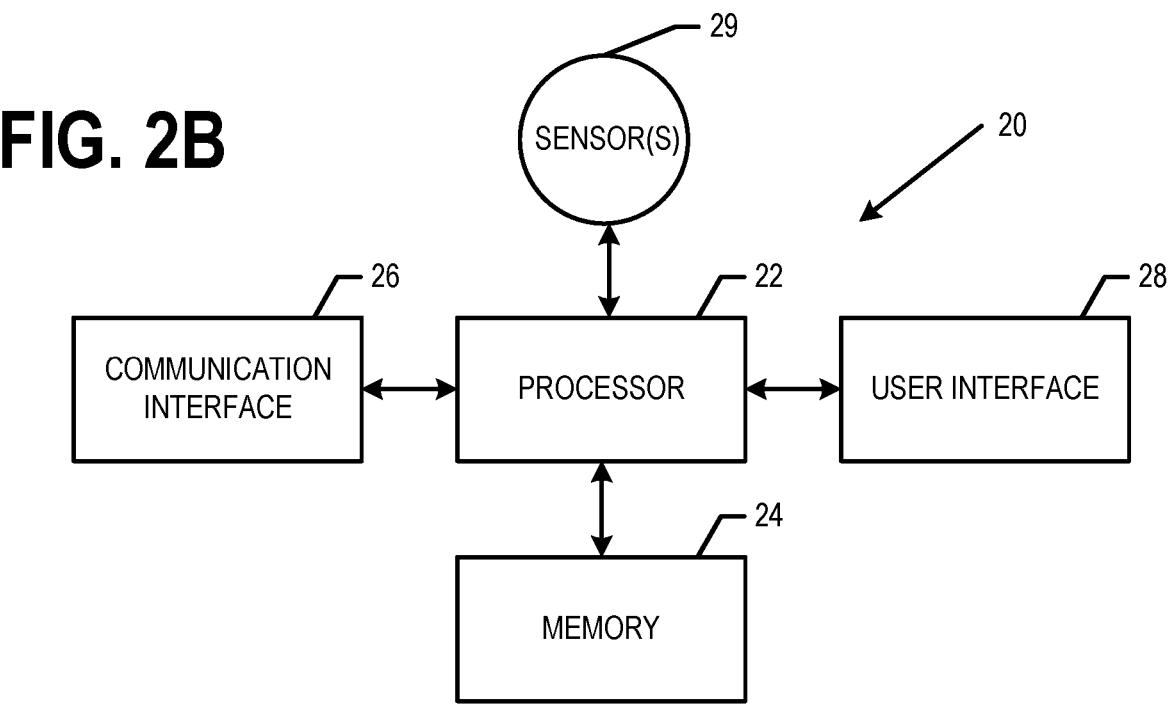
Figure 3:
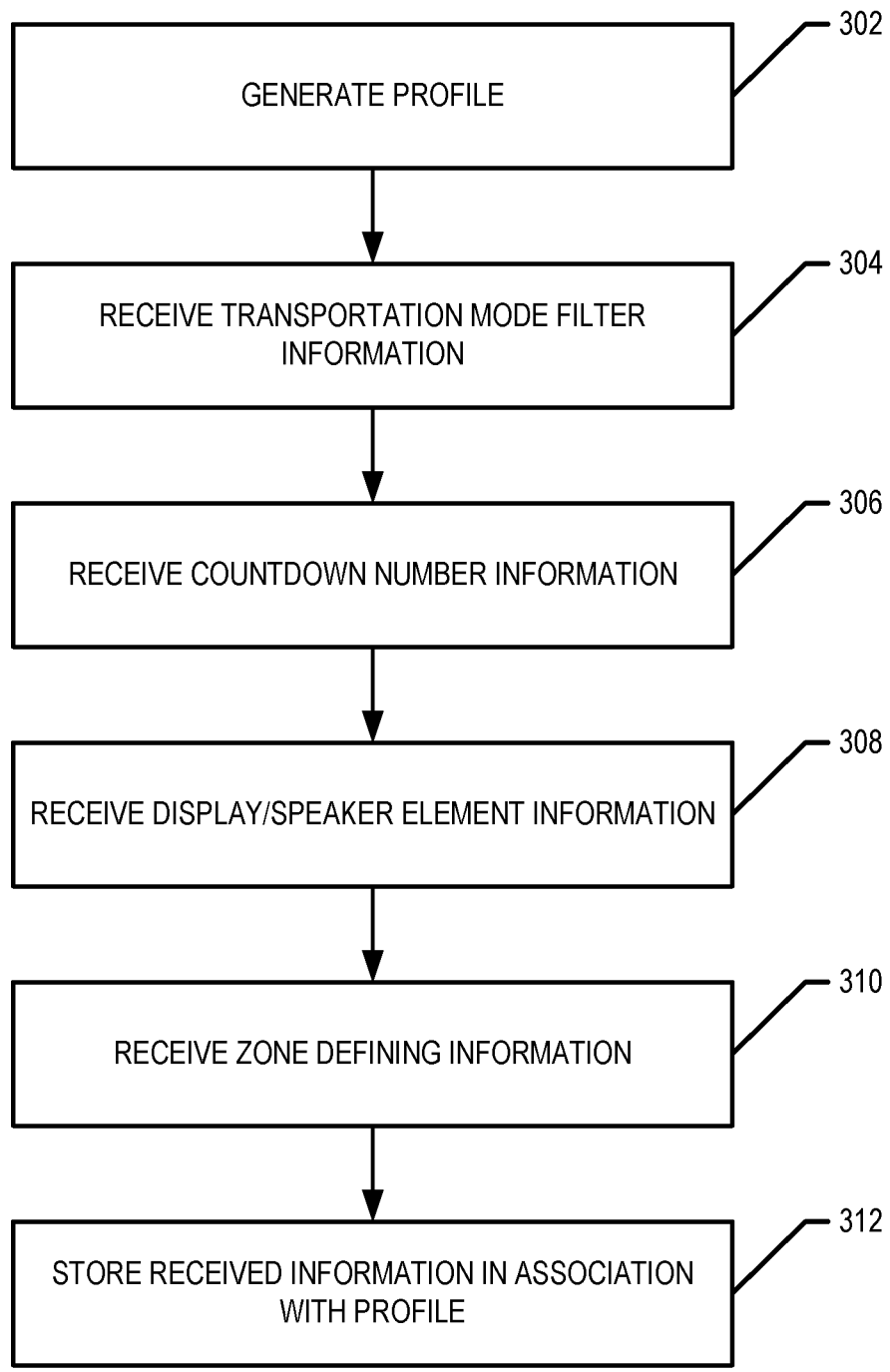
Figure 4:
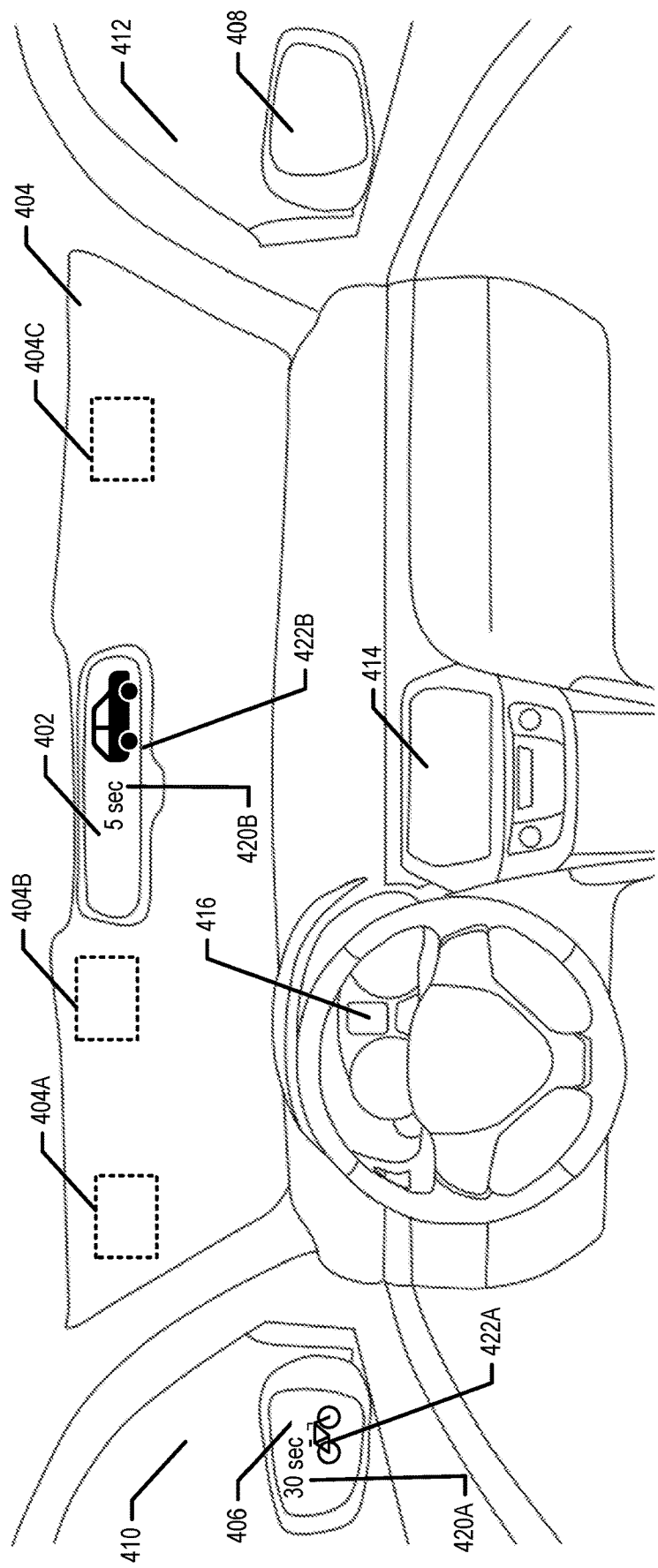
Figure 5:
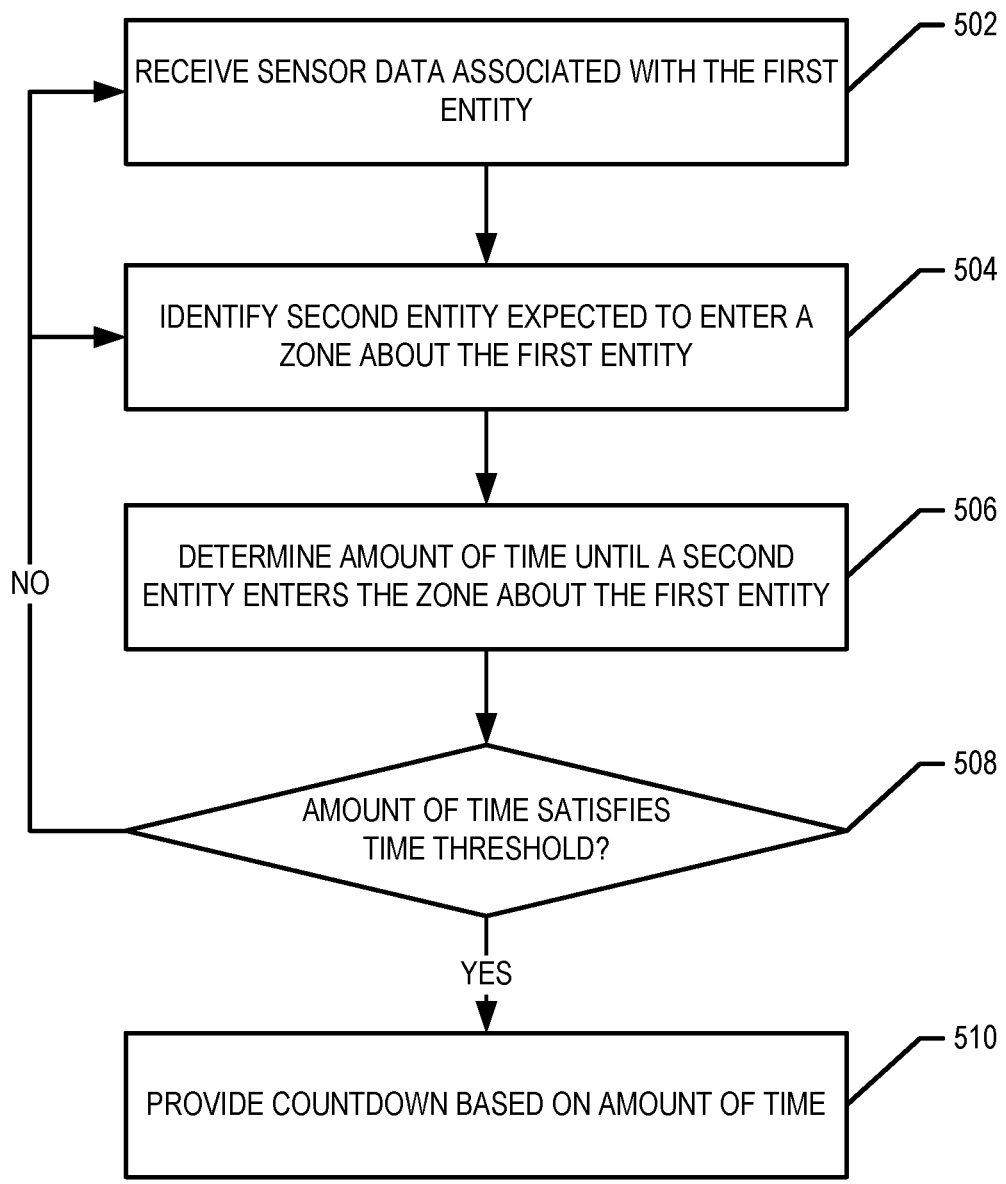
Figure 10:
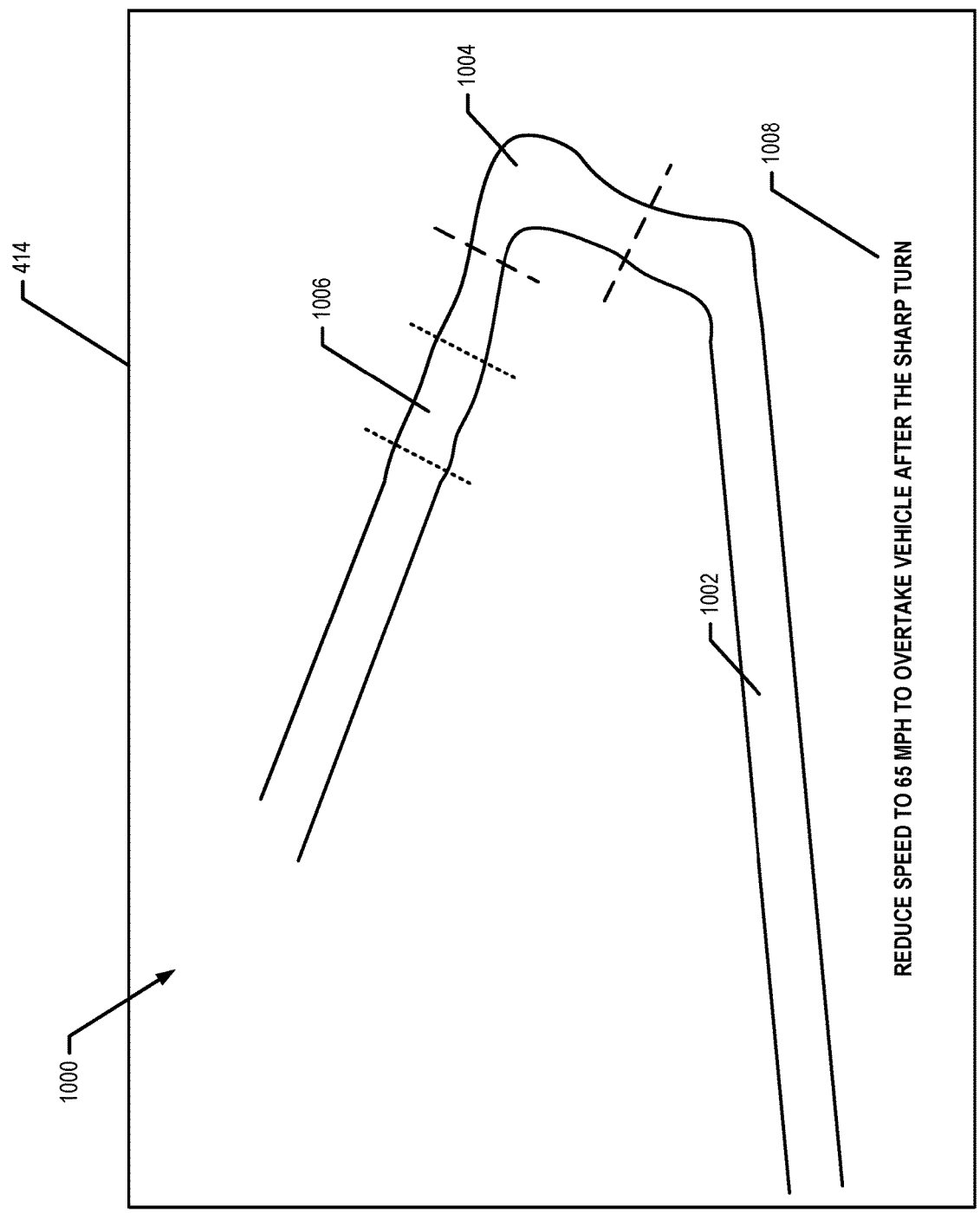

Having thus described certain example embodiments in general terms, reference will hereinafter be made to the accompanying drawings, which are not necessarily drawn to scale, and wherein:

FIG. 1A is a block diagram showing an example architecture of one embodiment of the present disclosure;

FIG. 1B is a block diagram showing another example architecture of one embodiment of the present disclosure;

FIG. 2A is a block diagram of a remote apparatus that may be specifically configured in accordance with an example embodiment;

FIG. 2B is a block diagram of a first entity apparatus that may be specifically configured in accordance with an example embodiment;

FIG. 3 is a flowchart illustrating operations performed, such as by a remote apparatus of FIG. 2A and/or a first entity apparatus of FIG. 2B to establish a profile, in accordance with an example embodiment;

FIG. 4 is a diagram illustrating some example display elements within a first entity and the example display of a countdown via some of the example display elements, in accordance with an example embodiment;

FIG. 5 is a flowchart illustrating operations performed, such as by a remote apparatus of FIG. 2A and/or a first entity apparatus of FIG. 2B to provide a countdown, in accordance with another example embodiment;

FIG. 6 is a flowchart illustrating operations performed, such as by a remote apparatus of FIG. 2A and/or a first entity apparatus of FIG. 2B to cause display of a countdown, in accordance with an example embodiment;

FIG. 7 is a flowchart illustrating operations performed, such as by a remote apparatus of FIG. 2A and/or a first entity apparatus of FIG. 2B to filter countdowns provided based on a mode of transportation of the corresponding second entity, in accordance with an example embodiment;

FIG. 8 is a flowchart illustrating operations performed, such as by a remote apparatus of FIG. 2A and/or a first entity apparatus of FIG. 2B, to control the first entity in accordance with a navigation function performed based on a countdown, in accordance with an example embodiment;

FIG. 9 a flowchart illustrating operations performed, such as by a remote apparatus of FIG. 2A and/or a first entity apparatus of FIG. 2B, to identify an interaction section of a roadway and to perform a navigation function based thereon; and FIG. 10 is a diagram illustrating an example interaction section and a result of performing a navigation function based on the example interaction section.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present disclosure. As used herein, the terms "substantially" and "approximately" refer to values that are within manufacturing and/or engineering guidelines, tolerances, and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided in accordance with an example embodiment in order to determine points of time when respective interactions between one or more second entities and a first entity are expected to begin and provide a countdowns to the respective points in time. In various embodiments, the countdowns are provided to a human operator and/or passenger onboard the first entity via a display element and/or speaker element of the first entity, for example. In various embodiments, the countdowns are provided as input for performing a navigation function. The result of the navigation function may be provided to a human operator and/or passenger onboard the first entity (e.g., via a display element and/or speaker element of the first entity) and/or provided to a machine operator (e.g., autonomous driving system and/or ADAS) of the first entity.

In various embodiments, a first entity is a mobile entity. For example, the first entity may be a mode of transportation having a first entity apparatus onboard and/or co-located therewith. For example, the first entity may be a motor vehicle, non-motor vehicle, automobile, car, scooter, truck, van, bus, motorcycle, bicycle, Segway, golf cart, tractor trailer, commercial vehicle, pedestrian, boat, personal watercraft, and/or the like. In various embodiments, a second entity is another mobile entity. For example, a second entity may be a mode of transportation. For example, a second entity may be a motor vehicle, non-motor vehicle, automobile, car, scooter, truck, van, bus, motorcycle, bicycle, Segway, golf cart, tractor trailer, commercial vehicle, pedestrian, boat, personal watercraft, and/or the like. In an example embodiment, a second entity may be a non-mobile entity such as a building, traffic sign, tree, telephone pole, mailbox, streetlight, bridge or overpass support column, and/or the like. In an example embodiment, a second entity may have a second entity apparatus onboard and/or co-located therewith.

In various embodiments, the first entity apparatus comprises and/or is in communication with one or more sensors. The one or more sensors capture sensor information/data and provide the sensor information/data such that the first entity apparatus and/or a remote apparatus receive at least a portion of the sensor information/data. In various embodiments, second entities within the vicinity of the first entity are identified based at least in part on the sensor information/data. In an example embodiment, the sensor information/data comprises location information/data (e.g., global navigation satellite system (GNSS) information/data or location information/data determined through various localization processes). A remote apparatus may receive the location information/data corresponding to the first entity and location information/data corresponding to one or more second entities. Second entities in the vicinity of the first entity may then be determined based on the location information/data (e.g., by the remote apparatus). In an example embodiment, the sensor information/data may comprise a lidar point cloud, radar point cloud, optical image, and/or the like that may be processed to identify second entities within the vicinity of the first entity. Based at least in part on the sensor information/data, a point in time when an interaction between the second entity and the first entity is determined. In various embodiments, a second entity is interacting with a first entity when the second entity is at least partially within a zone defined around the first entity. In various embodiments, the point in time when an interaction between a second entity and the first entity is expected to begin is the point in time that it is expected the second entity will enter and/or intersect a boundary of the zone defined around the first entity. In various embodiments, the zone around the first entity is defined by a profile associated with the first entity and/or a human operator and/or passenger of the first entity. In various embodiments, rather than determining a point in time at which the interaction is expected to begin, an amount of time until the interaction is expected to begin may be determined.

In various embodiments, the identified second entities may be filtered based on the mode of transportation of the second entity, the amount of time between the current time and the determined point in time, the direction from which second entity is approaching and/or is being approached by the first entity, a number of countdowns to be provided at one time, and/or the like. In various embodiments, the filtering is performed based on information/data stored in a profile corresponding to the first entity and/or a human operator and/or passenger of the first entity.

In various embodiments, a countdown from the current time to the point in time and/or time until an interaction between the first entity and the second entity is expected to begin may be generated. The countdown may be provided to a human operator and/or passenger onboard the first entity, in an example embodiment. In various embodiments, the countdown may be provided such that the provision of the countdown provides information/data regarding the second entity, the direction from which the second entity is approaching and/or being approached by the first entity, and/or the like. For example, a symbol indicating the mode of transportation associated with the second entity may be provided alongside the numerical countdown. For example, the display element and/or speaker element of the first entity used to provide the countdown may provide an indication of the direction from which the second entity is approaching and/or being approached by the first entity. In an example embodiment, the countdown may be provided as input to a navigation function. A result of the navigation function may be provided (e.g., displayed and/or audibly provided) to a human operator and/or passenger of the first entity and/or provided to a machine operator (e.g., autonomous driving system and/or ADAS) of the first entity, such that the operation of the first entity may be modified as necessary to prevent and/or change an interaction with the second entity, in an example embodiment.

Various embodiments provide methods, apparatus, systems, computer program products and/or the like configured to providing countdowns that countdown from a current time to a point in time when an interaction between a first entity and a second entity is expected to begin. For example, a remote apparatus and/or first entity apparatus may receive sensor information/data and identify one or more second entities and times until respective interactions between the first entity and the second entities are expected to begin. One or more countdowns until the respective times until the respective interactions between the first entity and the second entities are expected to begin are generated and provided. The countdowns may be provided via a display element and/or speaker element for human consumption, in various embodiments. In various embodiments, the countdowns are provided as input to navigation functions. The results of the navigation function may be provided (e.g., displayed and/or audibly provided) to a human operator and/or passenger onboard the first entity and/or provided to a machine user (e.g., autonomous driving system and/or ADAS) of the first entity such that the interaction between the first entity and second entities may be prevented and/or changed/modified.

FIG. 1A provides an illustration of an example system that can be used in conjunction with various embodiments of the present disclosure. As shown in FIG. 1A, the system may include one or more remote apparatuses 10, a plurality of first entity apparatuses 20, wherein each first entity apparatus 20 is disposed on a first entity 25, one or more second entity apparatuses 30, wherein each second entity apparatus 30 is disposed on a second entity 35, one or more networks 50, and/or the like. In various embodiments, a first and second entity apparatuses 20, 30 are a mobile computing entities and/or mobile apparatuses. In various embodiments, a first or second entity apparatus 20, 30 may be an in vehicle navigation system, vehicle control system, a mobile computing device, a mobile data gathering platform, smartphone, mobile computing entity having navigation capabilities, and/or the like. For example, a first or second entity apparatus 20, 30 may be an in vehicle navigation system mounted within and/or be onboard a first or second entity 25, 35, respectively. Some non-limiting examples of first or second entities include a motor vehicle, non-motor vehicle, automobile, car, scooter, truck, van, bus, motorcycle, bicycle, Segway, golf cart, tractor trailer, commercial vehicle, pedestrian, boat, personal watercraft, drone, and/or the like. In an example embodiment, the first entity apparatus 20 may be a vehicle control system configured to autonomously drive a first entity 25, assist in control of a first entity 25, monitor various aspects of the first entity 25 (e.g., fault conditions, motor oil status, battery charge level, fuel tank fill level, and/or the like) and/or the like.

FIG. 1B provides an illustration of another example system that can be used in conjunction with various embodiments of the present disclosure. As shown in FIG. 1B, the system may include a plurality of first entity apparatuses 20, wherein each first entity apparatus 20 is disposed on a first entity 25, and one or more second entity apparatuses 30, wherein each second entity apparatus 30 is disposed on a second entity 35, and/or the like. In various embodiments, a first and second entity apparatuses 20, 30 may communicate with one another using vehicle-to-vehicle (V2V) communication protocols.

In various embodiments, the first entity apparatus 20 is configured to autonomously drive a first entity 25 may perform multiple functions that are similar to those performed by a first entity apparatus 20 configured to be an ADAS (e.g., lane keeping, lane change assistance, maintaining a lane, merging, etc.). In some embodiments, a first entity apparatus 20 may be onboard a personal vehicle, commercial vehicle, public transportation vehicle, fleet vehicle, and/or other vehicle. In various embodiments, the first entity apparatus 20 may be a smartphone, tablet, personal digital assistant (PDA), personal computer, desktop computer, laptop, and/or other mobile computing device.

In an example embodiment, the remote apparatus 10 may be a server, group of servers, distributed computing system, and/or other computing system. In an example embodiment, the remote apparatus 10 is not located onboard a vehicle. For example, the remote apparatus 10 may be in communication with one or more first entity apparatuses 20, one or more second entity apparatuses 30, and/or the like via one or more wired or wireless networks 50.

In an example embodiment, a remote apparatus 10 may comprise components similar to those shown in the example remote apparatus 10 diagrammed in FIG. 2A. In an example embodiment, the remote apparatus 10 is configured to receive sensor information/data from one or more first entity apparatuses 20 and/or second entity apparatuses 30, generate and provide one or more countdowns based at least in part on the sensor information/data, perform one or more navigation functions based on one or more countdowns and provide results of performing the one or more navigation functions, and/or the like. For example, as shown in FIG. 2A, the remote apparatus 10 may comprise a processor 12, memory 14, a user interface 18, a communications interface 16, and/or other components configured to perform various operations, procedures, functions or the like described herein. In at least some example embodiments, the memory 14 is non-transitory. In an example embodiment, the processor 12 may comprise one or more central processing units (CPUs) and/or one or more graphics processing units (GPUs).

In an example embodiment, a first entity apparatus 20 is onboard a first entity 25. In an example embodiment, the first entity apparatus 20 may be configured to capture sensor information/data via one or more sensors onboard the first entity 25, receive and/or provide sensor information/data, generate or receive one or more countdowns, provide one or more countdowns, perform one or more navigation functions based on one or more countdowns, and provide results of performing the one or more navigation functions, and/or the like. In various embodiments, the first entity apparatus 20 is configured to cause one or more sensors onboard the first entity 25 to capture sensor information/data and receive (e.g., by a processor of the first entity apparatus 20) the sensor information/data. In an example embodiment, the sensor information/data comprises location information/data (e.g., geolocation such as latitude and longitude and/or the like) indicating a location of the first entity 25 and/or first entity apparatus 20 and/or may be used to perform a localization process to determine location information/data for the first entity 25. In an example, location information/data indicates a position and/or heading of the first entity 25 at the time the sensor information/data was captured. In an example embodiment, the sensor information/data may comprise information/data regarding the surroundings of the first entity. For example, the sensor information/data may comprise radar point clouds, lidar point clouds, optical images, ultrasonic point clouds, and/or the like. In various embodiments, the location, heading, and/or velocity of the first entity 25 and/or one or more second entities 35 may be determined based at least in part on the sensor information/data. The location, heading and/or velocity of the first entity 25 and/or one or more second entities 35 may be used to generate and/or determine respective expected trajectories for each of the first entity 25 and/or one or more second entities 35. The expected trajectories may be used to determine whether an interaction between a first entity 25 and a second entity 35 is expected, and, in instances when an interaction is expected, the amount of time until interaction is expected to begin. A countdown until an interaction is expected to begin may be provided such that the interaction may be prevented and/or changed.

In an example embodiment, as shown in FIG. 2B, the first entity apparatus 20 may comprise a processor 22, memory 24, a communications interface 26, a user interface 28, one or more sensors 29 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the first entity apparatus 20 to determine one or more features of the corresponding first entity's 25 surroundings; determine a location, heading, and/or velocity of the first entity 25; and/or monitor the first entity's 25 operating parameters), and/or other components configured to perform various operations, procedures, functions or the like described herein. In at least some example embodiments, the memory 24 is non-transitory. In various embodiments, the user interface 28 comprises one or more output elements. For example, the one or more output elements may comprise one or more display elements and/or one or more speaker elements. The one or more display elements may include the windshield of the first entity, an in-vehicle display, a driver side front window, a passenger side front window, a driver side side-view mirror, a passenger side side-view mirror, a rear view mirror, a dashboard display element, and/or the like. In an example embodiment, the first entity apparatus 20 is in communication with a heads-up display worn by a human operator and/or passenger onboard the first entity 25 and the heads-up display may be used as a display element. The first entity may comprise one or more speaker elements, such as speakers located in the back of the first entity, front of the first entity, passenger side, and/or driver side. In an example embodiment, the first entity apparatus 20 is in communication with a headset, headphones, or earbuds worn by a human operator and/or passenger onboard the first entity 25 and the headset, headphones, or earbuds may be used a speaker element.

In an example embodiment, a second entity apparatus 30 may be configured to provide location information/data (e.g., location, heading, and/or velocity) corresponding to a second entity 35. For example, the second entity apparatus 30 may provide the location information/data such that a remote apparatus 10 receives the location information/data. In various embodiments, a second entity apparatus 30 may be similar to a first entity apparatus 20. For example, a second entity apparatus 30 may comprise a processor similar to processor 22, a memory similar to memory 24, a communications interface similar to communications interface 26, a user interface similar to user interface 28, one or more sensors similar to sensors 29, and/or other components configured to perform various operations, procedures, functions or the like described herein. In at least some example embodiments, the memory is non-transitory.

In an example embodiment, the remote apparatus 10 may be in communication with one or more of first entity apparatuses 20, and/or one or more second entity apparatuses 30. In an example embodiment, the remote apparatus 10 may receive instances of sensor information/data, generate and/or determine countdowns, filter countdowns based on profiles, perform navigation functions based on the countdowns, provide (e.g., transmit) countdowns and/or results of navigation functions, and/or the like. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a first entity apparatus 20 and/or second entity apparatus 30 may be in communication with a remote apparatus 10 via the network 50. For example, a first entity apparatus 20 and/or second entity apparatus 30 may communicate with the remote apparatus 10 via a network, such as the Cloud. For example, the Cloud may be a computer network that provides shared computer processing resources and data to computers and other devices connected thereto. For example, the first entity apparatus 20 may be configured to provide one or more instances of sensor information/data via the network 50 and/or receive one or more countdowns and/or results of navigation functions via the network 50. For example, the remote apparatus 10 may be configured to receive instances of sensor information/data, and/or provide countdowns and/or results of navigation functions via the network 50. For example, a consumer apparatus 30 may be configured to provide sensor information/data via the network 50.

Certain example embodiments of the remote apparatus 10, first entity apparatus 20, and/or second entity apparatus 30 are described in more detail below with respect to FIGS. 2A and 2B.

II. Example Operation

Example embodiments provide methods, apparatus, systems, computer program products, and/or the like for generating and providing a countdown until the beginning of an interaction between a first entity 25 and a second entity 35. In various embodiments, the first and/or second entity may be a motor vehicle, non-motor vehicle, automobile, car, scooter, truck, van, bus, motorcycle, bicycle, Segway, golf cart, tractor trailer, commercial vehicle, pedestrian, boat, personal watercraft, and/or the like. In various embodiments, a second entity is said to be interacting with a first entity when the second entity is at least partially within a zone defined around the first entity. Thus, an interaction between the first entity and the second entity begins when the second entity first enters the zone defined around the first entity and/or first intersects a boundary of the zone defined around the first entity. Based on the determination, detection, and/or the like of a second entity in the vicinity of the first entity, it may be determined whether an interaction between the first and second entity is expected to occur within a particular time period. The particular time period may be predefined, determined based on profile information/data, configurable, and/or the like in various embodiments. If it is determined (e.g., by a remote apparatus 10 and/or a first entity apparatus 20) that an interaction between the first and second entity is expected to begin within the particular time period, a countdown until the interaction between the first and second entity is expected to begin is determined, generated, and/or the like.

The countdown may then be provided. In various embodiments, the countdown may be provided via a display element and/or speaker element of the first entity 25 (and/or in communication with the first entity apparatus 20) such that the user may be made aware of the expected interaction and may take action to prevent and/or change the interaction. For example, the interaction may be prevented by adjusting the trajectory of the first entity 25 such that the second entity 35 does not enter the zone defined around the first entity 25. For example, the interaction may be changed by adjusting the trajectory of the first entity 25 such that the interaction begins at a different time, such that the second entity 35 does not penetrate as far into the zone defined around the first entity 25 (e.g., such that the second entity 35 still enters the zone, but does not make contact with the first entity 25), and/or the like. In various embodiments, instructions for controlling the first entity 25 (e.g., instructions for execution by an autonomous driving system and/or ADAS configured to control and/or aid in the control of the first entity 25). For example, the instructions may cause the interaction to be prevented and/or changed. In various embodiments, the countdown may be provided as input to a navigation function and the results of the navigation function may be provided via a display element and/or speaker element and/or used to generate instructions for controlling the first entity 25, such that the interaction may be prevented and/or changed.

a. Establishing a Profile

In various embodiments, profile information/data of a profile corresponding to the first entity and/or a human operator and/or passenger onboard the first entity may be used to make various determinations. For example, in various embodiments, the zone around the first entity is defined based on profile information/data (e.g., stored in memory 14, 24). In various embodiments, the second entity is associated with a mode of transportation (e.g., motor vehicle, non-motor vehicle, automobile, car, scooter, truck, van, bus, motorcycle, bicycle, Segway, golf cart, tractor trailer, commercial vehicle, pedestrian, boat, drone, personal watercraft, and/or the like). In an example embodiment, the countdowns that are provided are filtered based on the mode of transportation associated with the second entity. In various embodiments, the filtering of the countdowns based on a mode of transportation associated with the second entity may be performed based on a function class of road the first entity is traveling along, profile information/data, a combination thereof, and/or the like. In various embodiments, the countdowns that are provided may be filtered by the amount of time expected for the beginning of the interaction of the first entity and the second entity. In an example embodiment, the filtering of the countdowns by the amount of time may be based at least in part on profile information/data. In various embodiments, the display elements and/or speaker elements used to provide the countdown and/or result of performing the navigation function may be selected based at least in part on profile information/data.

FIG. 3 provides a flowchart illustrating various processes, procedures, operations, and/or the like that may be performed, for example by a first entity apparatus 20 and/or a remote apparatus 10, to establishing a profile corresponding to a first entity and/or a user that may be a human operator and/or passenger onboard the first entity 25. Starting at block 302, at blank or default profile is generated. For example, the first entity apparatus 20 and/or remote apparatus 10 may generate a blank or default profile. For example, the remote apparatus 10 and/or first entity apparatus 20 may respectively comprise means, such as processor 12, 22, memory 14, 24, and/or the like for generating a blank or default profile. In various embodiments, a blank profile is a data structure with blank data fields. In various embodiments, a default profile is a data structure with the value of one or more data fields populated with a default value. In various embodiments, a profile is a data structure comprising a plurality of data fields configured to be populated with and/or store profile information/data. In various embodiments, the profile information/data comprises information/data that may be used to define a zone around the first entity, filter second entities and/or corresponding countdowns based on a mode of transportation associated with the respective second entities, filter second entities and/or corresponding countdowns based on the amount of time until the interaction between the first entity and the respective second entity is expected to begin, determine a display element and/or speaker element used to provide the countdown and/or result of a navigation function, provide as input to one or more navigation functions, and/or the like.

At block 304, transportation mode filter information/data is received. For example, a user may interact with the user interface 18, 28 of the remote apparatus 10, the first entity apparatus 20, and/or another user computing entity (e.g., a desktop, laptop, tablet, mobile phone, and/or the like) to provide transportation mode filter information/data via a dedicated application, online portal, fillable form, and/or the like. The first entity apparatus 20 and/or remote apparatus 10 may receive the transportation mode filter information/data. For example, the remote apparatus 10 and/or first entity apparatus 20 may respectively comprise means, such as processor 12, 22, memory 14, 24, communications interface 16, 26, user interface 18, 28, and/or the like, for receiving transportation mode filter information/data. In various information/data the transportation mode filter information/data provides an indication of one or more modes of transportation for which countdowns should be provided, one or more modes of transportation for which countdowns should not be provided, and/or a combination thereof. In an example embodiment, the mode of transportation information/data may correspond to a particular road function class. For example, the transportation mode filter information/data may indicate that countdowns corresponding to second entities associated with pedestrian and bicycle modes of transportation should not be provided when the first entity 25 is on the interstate, freeway, or highway, but should be provided when the first entity 25 is on surface streets (e.g., residential access roads, local distributor roads, and/or the like).

At block 306, countdown number information/data is received. For example, a user may interact with the user interface 18, 28 of the remote apparatus 10, the first entity apparatus 20, and/or another user computing entity (e.g., a desktop, laptop, tablet, mobile phone, and/or the like) to provide countdown number information/data via the dedicated application, online portal, fillable form, and/or the like. The remote apparatus 10 and/or first entity apparatus 20 may receive the countdown number information/data. For example, the first entity apparatus 20 and/or remote apparatus 10 may respectively comprise means, such as processor 12, 22, memory 14, 24, communications interface 16, 26, user interface 18, 28, and/or the like, for receiving countdown number information/data. In various embodiments, the countdown number information/data indicates a total number of countdowns to be provided at once and/or simultaneously. In various embodiments, the countdown number information/data indicates a number of countdowns that corresponding to second entities of a particular transportation mode that are to be provided at once and/or simultaneously. In an example embodiment, the default profile indicates that only one countdown corresponding to each mode of transportation can be provided at once and/or simultaneously. For example, two countdowns corresponding to bicycles would not be provided at once and/or simultaneously based on this example default profile.

At block 308, display element information/data and/or speaker element information/data may be provided. For example, a user may interact with the user interface 18, 28 of the remote apparatus 10, the first entity apparatus 20, and/or another user computing entity (e.g., a desktop, laptop, tablet, mobile phone, and/or the like) to provide display element information/data and/or speaker element information/data via the dedicated application, online portal, fillable form, and/or the like. The first entity apparatus 20 and/or remote apparatus 10 may receive the display element information/data and/or speaker element information/data. For example, the remote apparatus 10 and/or first entity apparatus 20 may respectively comprise means, such as processor 12, 22, memory 14, 24, communications interface 16, 26, user interface 18, 28, and/or the like, for receiving display element information/data and/or speaker element information/data. In various embodiments, the display element information/data and/or speaker element information/data may be used (e.g., by the first entity apparatus 20 and/or remote apparatus 10) to determine which display element and/or speaker element of the first entity 25 is to be used to provide (e.g., display and/or audibly provide) the countdown and/or result of the navigation function. For example, if a second entity 35 (e.g., a bicycle) is approaching the first entity 25 on the driver side, the countdown may be provided on the driver side mirror, driver side window, a driver side portion of the windshield, and/or the like. In another example, if a second entity 35 (e.g., a pedestrian) is approaching the first entity 25 from the passenger side, the countdown may be provided on the passenger side mirror, passenger side window, a passenger side portion of the windshield, and/or the like. In still another example, if a second entity 35 (e.g., a passenger vehicle) is approaching the first entity 25 from behind, the countdown may be provided in a central portion of the windshield, in the rear view mirror, and/or the like. For example, the countdown may be provided via a display element and/or speaker element that may indicate the direction from which the second entity is approaching the first entity and/or is being approached by the first entity.

FIG. 4 provides an example view of a portion of a passenger compartment of a first entity 25 that is a vehicle that includes a plurality of display elements. For example, the first entity may include display elements such as rear view mirror 402, windshield 404 (which may include various portions (e.g., a driver side portion 404A, center portion 404B, passenger side portion 404C), in an example embodiment), driver side mirror 406, passenger side mirror 408, driver side window 410, passenger side window 412, an in-vehicle display 414, a dashboard display element 416, and/or the like. For example, FIG. 4 illustrates a countdown 420A with a corresponding transportation mode symbol 422A indicating that a second entity 35 that is a bicycle is approaching the first entity from the driver side and an interaction between the first entity and the second entity is expected to begin in 30 seconds being provided via the driver side mirror 406. FIG. 4 further illustrates a countdown 420B with a corresponding transportation mode symbol 422B indicating that a second entity 35 that is a passenger vehicle is approaching the first entity 25 from behind and an interaction between the first entity 25 and the second entity 35 is expected to begin in 5 seconds being provided via the rear view mirror 402. Though not shown, an example first entity 25 (e.g., a vehicle) may include a plurality of speaker elements such as passenger side speaker elements located on the passenger side of the first entity, driver side speaker elements located on the driver side of the first entity, rear speaker elements located toward the back of the first entity, from speaker elements located toward the front of the first entity (e.g., in the dash), and/or the like. Thus, the countdown may be provided in a manner that generally indicates the direction from which the second entity is approaching the first entity and/or is being approached by the first entity.

Continuing with FIG. 3, at block 310, zone defining information/data is received. For example, a user may interact with the user interface 18, 28 of the remote apparatus 10, the first entity apparatus 20, and/or another user computing entity (e.g., a desktop, laptop, tablet, mobile phone, and/or the like) to provide zone defining information/data via the dedicated application, online portal, fillable form, and/or the like. The first entity apparatus 20 and/or remote apparatus 10 may receive the zone defining information/data. For example, the remote apparatus 10 and/or first entity apparatus 20 may respectively comprise means, such as processor 12, 22, memory 14, 24, communications interface 16, 26, user interface 18, 28, and/or the like, for receiving zone defining information/data. In various embodiments, the zone defining information/data is used to define a zone around the first entity 25. An interaction between a first entity 25 and a second entity 35 is said to occur when the second entity 35 enters the zone defined around the first entity 25. In various embodiments, the zone may be defined as a circle or ellipse centered on the first entity 25 and having a defined radius (and/or minor/major axes). In various embodiments, the zone may be defined to be a particular distance from a surface of the first entity 25. In an example embodiment, the particular distance from the surface of the first entity 25 may be dependent on the side of the first entity 25. For example, zone may be defined around the first entity 25 such that the boundary of the zone is located two meters back from the back surface of the first entity, two meters forward from the front surface of the first entity, one meter out from the driver side surface of the first entity, and half a meter from the passenger side surface of the first entity. In an example embodiment, the zone is a three-dimensional zone and may include boundaries defined above or below the surface of the first entity 25. In an example embodiment, different zones may be defined around the first entity for different transportation modes. For example, the zone used in relation to second entities that are pedestrians or bicycles may be different from the zone used in relation to second entities that are tractor trailers or commercial trucks, in an example embodiment.

At block 312, the received profile information/data is stored in the profile. For example, the data fields of the data structure generated at block 302 may be populated with the received profile information/data and the profile may be stored. For example, the profile may be updated and/or populated with the transportation mode filter information/data, countdown number information/data, display element information/data, speaker element information/data, zone defining information/data, and/or other received profile information/data and the profile may be stored. For example, the first entity apparatus 20 and/or the remote apparatus 10 may store the received profile information/data in the profile. For example, the remote apparatus 10 and/or first entity apparatus 20 may respectively comprise means, such as processor 12, 22, memory 14, 24, and/or the like for storing the received profile information/data in the profile. The remote apparatus 10 and/or first entity apparatus 20 may later access the profile (e.g., from memory 14, 24) to use profile information/data to perform various tasks regarding providing a countdown.

b. Providing a Countdown

FIG. 5 provides a flowchart illustrating various processes, procedures, operations, and/or the like, that may be performed by a first entity apparatus 20 and/or a remote apparatus 10, to provide a countdown, in accordance with various embodiments of the present disclosure.

Starting at block 502, sensor information/data is received. For example, the first entity apparatus 20 and/or remote apparatus 10 may receive sensor information/data. For example, the remote apparatus 10 and/or the first entity apparatus 20 may respectively comprise means, such as processor 12, 22, memory 14, 24, communications interface 16, 26, sensors 29, and/or the like, for receiving sensor information/data.

For example, a first entity 25 may be traversing at last a portion of a traversable network (e.g., path network, lane network, road network, and/or the like), beginning/preparing to traverse at least a portion of the traversable network, completing a trip that includes traversing at least a portion of the traversable network, and/or the like. For example, a first entity 25 may be traveling along a portion of a road, pulling out of a parking spot, preparing to open doors to allow passengers to exit the first entity 25, and/or the like. One or more sensors 29 onboard the first entity 25 may capture sensor information/data and provide the sensor information/data to the first entity apparatus 20. The first entity apparatus 20 may receive the sensor information/data (e.g., at processor 22) and/or provide the sensor information/data (e.g., via communications interface 26) such that the remote apparatus 10 receives the sensor information/data (e.g., at processor 12 via communications interface 16). In various embodiments, the sensor information/data may include location information/data indicating a location, heading, velocity, and/or the like of the first entity 25. In various embodiments, the sensor information/data may comprise one or more radar point clouds, lidar point clouds, optical images, and/or the like that represent the surroundings of the first entity 25. In an example embodiment, the sensor information/data may be captured by one or more sensors in the vicinity of the first entity 20. For example, the one or more sensors may be sensors 29 onboard and/or coupled to the first entity 20, sensors onboard and/or coupled to one or more second entities 30 in the vicinity of the first entity 20, sensors (e.g., RFID transceivers, radar, lidar, optical detectors/imagers, and/or the like) in the surroundings of the first entity 20, and/or the like. In various embodiments the sensor information/data is associated with at least the first entity 20 in that the sensor information/data includes at least one of location information/data corresponding to the first entity 20 and/or information/data corresponding to the surroundings of the first entity 20.

At block 504, one or more second entities 35 expected to have an interaction with the first entity 25 within a are identified based at least in part on the sensor information/data. For example, the first entity apparatus 20 and/or the remote apparatus 10 may identify one or more second entities 35 that are expected to have an interaction with the first entity 25 based at least in part on the sensor information/data. For example, the remote apparatus 10 and/or first entity apparatus 20 may respectively comprise means, such as processor 12, 22, memory 14, 24, communications interface 16, 26, and/or the like, for identifying one or more second entities 35 that are expected to interact with the first entity 25. For example, one or more second entities 35 that have trajectories (based on current location, heading, and/or velocity of the second entity) that indicate they are likely to enter the zone defined around the first entity 25 (e.g., based on the zone defining information/data of the profile information/data associated with the first entity 25 and/or a human operator and/or passenger onboard the first entity 25) are identified. In an example embodiment, the sensor information/data comprises one or more representations of the surroundings of the first entity 25 and may be processed, analyzed, and/or the like to (1) identify second entities in the surroundings of the first entity 25 and (2) determine respective locations, headings, and/or velocities of the second entities 35. In an example embodiment, the sensor information/data comprises location information/data (e.g., location, heading, and/or velocity) of the first entity 25. The remote apparatus 10 (e.g., via network 50) may receive location information/data (e.g., location, heading, and/or velocity) from the first entity 25 and a plurality of second entities 35. In an example embodiment, the first entity apparatus 20 may receive location information/data (e.g., location, heading, and/or velocity from a plurality of second entities 35 via V2V communications. Based on the location information/data for the first entity 25 and the location information/data for the plurality of second entities 35, the remote apparatus 10 may identify one or more second entities 35 that are traveling along trajectories that are expected to cause the respective one or more second entities to interact with the first entity. Thus, in various embodiments, the sensor information/data may be used to identify one or more second entities 35 that are expected to interact with the first entity 25 based on current trajectories of the first entity 25 and the respective one or more second entities 35.

At block 506, an amount of time between the current time and the point in time when an interaction between the first entity 25 and a second entity 35 is expected to begin is determined. For example, an amount of time between the current time and the point in time when an interaction between the first entity 25 and a second entity 35 is expected to begin may be determined for each second entity 35 identified at block 504. In various embodiments, the one or more second entities 35 identified at block 504 may be filtered (e.g., based on the transportation mode filter information/data of the profile information/data associated with the first entity 25 and/or a human operator and/or passenger onboard the first entity 25) and the amount of time between the current time and the point in time when an interaction between the first entity 25 and a second entity 35 is expected to begin is determined for second entities 35 remaining for consideration after the filtering is performed. In various embodiments, the amount of time between the current time and the point in time when an interaction between the first entity 25 and a second entity 35 is expected to begin is determined based on the respective current locations of the first and second entities, the respective current headings of the first and second entities, and the respective velocities of the first and second entities and also traffic or congestion level on the path between both entities. For example, the first entity apparatus 20 and/or the remote apparatus 10 may determine an amount of time between the current time and the point in time when an interaction between the first entity 25 and a second entity 35 is expected to begin. For example, the remote apparatus 10 and/or first entity apparatus 20 may respectively comprise means, such as processor 12, 22, memory 14, 24, and/or the like, for determining an amount of time between the current time and the point in time when an interaction between the first entity 25 and a second entity 35 is expected to begin.

At block 508, it is determined whether the amount of time between the current time and the point in time when an interaction between the first entity 25 and a second entity 35 is expected to begin satisfies a particular time threshold requirement. In an example embodiment, the amount of time between the current time and the point in time when an interaction between the first entity 25 and a second entity 35 is expected to begin satisfies a particular time threshold requirement when the amount of time is less than or equal to the particular time threshold. For example, interaction that are expected to begin within the next thirty seconds, minute, or two minutes may be of more interest than interactions that are expected to begin in eight minutes. For example, conditions may change over the next five minutes such that an interaction that was expected to begin in eight minutes is no longer relevant. In various embodiments, the particular time threshold may be specific to the mode of transportation of the second entity 35. In various embodiments, the particular time threshold may be determined based on the function class of road the first entity 25 is located on (e.g., determined based on map-matching the location of the first entity 25), profile information/data, combination thereof, and/or the like. For example, the first entity apparatus 20 and/or the remote apparatus 10 may determine whether the amount of time between the current time and the point in time when an interaction between the first entity 25 and a second entity 35 is expected to begin satisfies the particular time threshold requirement. For example, the remote apparatus 10 and/or the first entity apparatus 20 may respectively comprise means, such as processor 12, 22, memory 14, 24, and/or the like, for determining whether the amount of time between the current time and the point in time when an interaction between the first entity 25 and a second entity 35 is expected to begin satisfies the particular time threshold requirement.

When it is determined, at block 508, that the amount of time between the current time and the point in time when an interaction between the first entity 25 and a second entity 35 is expected to begin does not satisfy the particular time threshold requirement, a countdown corresponding to the second entity 35 and the expected interaction of the first entity therewith is not generated nor provided.

When it is determined, at block 508, that the amount of time between the current time and the point in time when an interaction between the first entity and a second entity 35 is expected to begin does satisfy the particular time threshold requirement, the process continues to block 510. At block 510, a countdown corresponding to the second entity 35 and the amount of time before the interaction between the first entity 25 and the second 35 are expected to begin is generated. In an example embodiment, a countdown 420 (e.g., 420A, 420B) is associated with a mode of transportation associated with and/or corresponding to the second entity 35. The countdown may be generated and provided along with a mode of transportation symbol 422 (e.g., 422A, 422B) that indicates that mode of transportation associated with and/or corresponding to the second entity 35. The countdown 420 and the associated mode of transportation symbol 422 and/or an indication of the mode of transportation associated with and/or corresponding to the second entity 35 may then be provided. For example, the first entity apparatus 20 and/or the remote apparatus 10 may generate and provide a countdown corresponding to and/or based on the amount of time until an interaction between the first entity 25 and the second entity 35 is expected to begin. For example, the remote apparatus 10 and/or the first entity apparatus 20 may respectively comprise means, such as processor 12, 22, memory 14, 24, communications interface 16, 26, user interface 28, and/or the like, for generating and providing a countdown corresponding to and/or based on the amount of time until an interaction between the first entity 25 and the second entity 35 is expected to begin. For example, the countdown may start that the amount of time until the interaction between the first entity 25 and the second entity 35 is expected to begin and countdown to zero (e.g., at the point in time when the interaction is expected to begin).

The countdown may be updated while the countdown is in the process of counting down. For example, the trajectory of the first entity 25 and/or the second entity 35 may change such that the interaction is prevented and the countdown may be terminated and no longer provided (e.g., by a display element or speaker element) and/or an indication that the interaction was prevented may be provided (e.g., as input to a navigation function and/or to generate instructions for controlling the first entity 25). In another example, the trajectory of the first entity 25 and/or the second entity 35 may change such that the interaction between the first and second entities 25, 35 is changed and the countdown may be updated accordingly. For example, if a second entity 35 is coming up behind a first entity 25 but the second entity 35 cannot change lanes at this time to pass, the second entity 35 may slow down such that an interaction that was initially expected to occur at a first time does not occur until a second time that is later than the first time. For example, while the countdown is counting down the time until an interaction is expected to begin, additional sensor information/data may be received. The additional sensor information/data may include updated location information/data corresponding to the first entity 25 and/or one or more point clouds or optical images corresponding to the updated surroundings of the first entity 25. An updated amount of time until the interaction may be determined based at least in part on the additional sensor information/data and the provided countdown and/or amount of time until the interaction is expected to begin may be updated accordingly.

As described above, the countdown may be provided via a display element and/or speaker element of the first entity 25 such that a human operator and/or passenger onboard the first entity 25 may be made of aware of the expected interaction. For example, the human operator and/or passenger onboard the first entity 25 may make adjustments to how the first entity 25 is operating (e.g., speed, direction, and/or the like) in order to prevent and/or change the interaction. In various embodiments, the countdown is provided such that instructions for controlling the first entity 25 by a machine operator (e.g., an autonomous driving system and/or ADAS which may be part of and/or in communication with the first entity apparatus 20) may be generated and/or provided to the machine operator of the first entity 25. In various embodiments, the countdown is provided such that the countdown is used as input in performing one or more navigation functions. Some non-limiting examples of navigation functions include route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control and/or guidance, route and/or maneuver visualization, identifying an interaction section and/or modifications thereto and/or the like. The result(s) of performing the navigation function(s) may be provided via a display element and/or speaker element of the first entity 25 or used to generate instructions for controlling the first entity 25 and provided to a machine operator of the first entity 25. For example, the navigation function and/or the instructions provided to the machine operator of the first entity 25 may be configured to prevent and/or change the interaction between the first entity 25 and the second entity 35.

c. Filtering Countdowns

In various embodiments, the countdowns provided may be filtered based on various attributes corresponding to the second entity 35. For example, the countdowns provided may be filtered based on the transportation mode associated with each respective the second entity 35, the direction from which the second entity is approaching the first entity 25 and/or is being approached by the first entity 25, and/or the like. In various embodiments, the countdowns provided may be filtered based on a total number of countdowns to be provided at once and/or simultaneously (e.g., such that the countdowns are provided in at least a partially time overlapping manner), the number of countdowns to be provided corresponding to second entities of a particular transportation mode at once and/or simultaneously, and/or the like. In various embodiments, if the maximum number of countdowns is exceeded, the countdowns corresponding to the interaction that are expected to happen and/or begin sooner are provided. For example, if only countdown is to be provided for each transportation mode, the countdown corresponding to a second entity of a particular transportation mode that has the least amount of time until it is expected that the interaction will begin of all the countdowns corresponding to second entities of the particular transportation mode is provided. In various embodiments, this filtering may be based on profile information/data.

FIG. 6 provides a flowchart illustrating various processes, procedures, operations, and/or the like for filtering the countdowns provided based on the transportation mode associated with each respective transportation mode. As noted above, various other forms of filtering are possible in various embodiments. In various embodiments, the filtering may be performed at any time between the beginning of block 504 (e.g., the identifying of the second entities 35 that have trajectories that indicate that the first and second entities are expected to interact) and the beginning of block 510 (e.g., the providing of the countdowns). In various embodiments, the filtering is performed by the remote apparatus 10. In some embodiments, the filtering is performed by the first entity apparatus 20.

Starting at block 602, the transportation mode of the second entity is identified and/or determined. In various embodiments, the first entity apparatus 20 and/or the remote apparatus 10 may identify and/or determine the transportation mode of the second entity. For example, the remote apparatus 10 and/or the first entity apparatus 20 may respectively comprise means, such as processor 12, 22, memory 14, 24, and/or the like, for identifying and/or determining a transportation mode corresponding to the second entity. For example, the remote apparatus 10 and/or the first entity apparatus 20 may analyze sensor information/data corresponding to the surroundings of the first entity 25 to determine and/or identify a transportation mode corresponding to the second entity 35. For example, if the sensor information/data comprises an optical image, radar point cloud, lidar point cloud, and/or the like, the image processing and/or point cloud processing (e.g., segmentation, classification, and/or the like) may be used to identify and/or determine a transportation mode corresponding to the second entity 35. In an example embodiment, the remote apparatus 10 may receive location information/data from a plurality of second entities 35. In an example embodiment, the location information/data may include and/or be associated with an identifier that identifies the corresponding second entity. For example, the identifier may be used to query a database which include a transportation mode corresponding to the second entity stored in association with the identifier. In an example embodiment, the location information/data may include and/or be associated with a transportation mode indicator that indicates a transportation mode of the corresponding second entity.

At block 604, it may be determined whether a countdown corresponding to the second entity is eligible to be provided based on the transportation mode corresponding to the second entity. For example, profile information/data corresponding to the first entity 25 and/or a human operator and/or passenger onboard the first entity 25 may be accessed and used to determine whether a countdown corresponding to the second entity is eligible to be provided based on the transportation mode corresponding to the second entity. As described above the profile information/data may include transportation mode filter information/data that may be used to filter the countdowns based on transportation modes corresponding to the respective second entities. In various embodiments, determining whether a countdown corresponding to the second entity is eligible to be provided based on the transportation mode corresponding to the second entity may include determining a function class of the road that the first entity is located on (e.g., by map matching the location of the first entity 25). For example, the first entity apparatus 20 and/or the remote apparatus 10 may determine whether a countdown corresponding to the second entity 35 is eligible to be provided based on the transportation mode corresponding to the second entity 35. For example, the remote apparatus 10 and/or the first entity apparatus 20 may respectively comprise means, such as processor 12, 22, memory 14, 24, and/or the like, for determining whether a countdown corresponding to the second entity 35 is eligible to be provided based on the transportation mode corresponding to the second entity 35.

When it is determined, at block 604, that the countdown corresponding to the second entity 35 is not eligible to be provided (e.g., is filtered out of a collection of countdowns that are eligible to be provided), the countdown corresponding to the second entity 35 is not provided.

When it is determined, at block 604, that the countdown corresponding to the second entity is eligible to be provided, the provision of the countdown corresponding to the second entity 35 is caused at block 606. For example, the first entity apparatus 20 and/or remote apparatus 10 may cause the provision of the countdown corresponding to the second entity 35. For example, the remote apparatus 10 and/or first entity apparatus 20 may respectively comprise means, such as processor 12, 22, memory 14, 24, and/or the like, for causing the provision of the countdown corresponding to the second entity 35. For example, the process may be caused to continue to block 510 for the countdown corresponding to second entity 35.

d. Determining a Display/Speaker Element for Providing the Countdown

In various embodiments, the countdown may be displayed via a display element of the first entity 25 and/or audibly provided via a speaker element of the first entity 25. In various embodiments, the countdown may be provided via a plurality (e.g., two or more) display and/or speaker elements of the first entity 25. In an example embodiment, the countdown is provided via only one display element or one speaker element. In an example embodiment, the countdown is provided via one display element and one speaker element. FIG. 7 provides a flowchart illustrating various process, procedures, operations, and/or the like for causing the countdown to be provided via a display element and/or speaker element of the first entity 25. In an example embodiment, the process for causing the countdown to be provided via a display element and/or speaker element may be performed between block 508 and block 510.

Starting at block 702, a direction associated with the interaction is identified and/or determined. For example, the direction associated with the interaction may be the direction from which the second entity 35 is approaching the first entity 25 and/or is being approached by the first entity 25. For example, the first entity apparatus 20 and/or remote apparatus 10 may identify and/or determine a direction associated with the interaction. For example, the remote apparatus 10 and/or first entity apparatus 20 may respectively comprise means, such as processor 12, 22, memory 14, 24, and/or the like, for identifying and/or determining a direction associated with the interaction. For example, the remote apparatus 10 and/or the first entity apparatus 20 may analyze sensor information/data corresponding to the surroundings of the first entity 25 to determine and/or identify a direction from which the second entity 35 is approaching the first entity 25 and/or being approached by the first entity 25. For example, if the sensor information/data comprises an optical image, radar point cloud, lidar point cloud, and/or the like, the image processing and/or point cloud processing (e.g., segmentation, classification, and/or the like) may be used to identify and/or determine a location, heading, and/or velocity of the second entity 35. The direction associated with the interaction may be determined based at least in part on the location, heading, and/or velocity of the second entity 35 as determined in relation to the first entity 25 (e.g., based on the sensor information/data). In an example embodiment, the remote apparatus 10 may receive location information/data (e.g., comprising a location, heading, and/or velocity) from a plurality of second entities 35. In an example embodiment, the location information/data corresponding to the second entity 35 and the location information/data corresponding to the first entity 25 may be used to determine and/or identify a direction associated with the interaction.

At block 704, a display element and/or speaker element corresponding to the direction associated with the interaction is identified and/or determined. In an example embodiment, the display element and/or speaker element corresponding to the direction associated with the interaction is identified and/or determined based at least in part on profile information/data corresponding to the first entity 25 and/or a human operator and/or passenger onboard the first entity 25. For example, in an example embodiment, if the second entity 35 is approaching the first entity 25 from the driver side of the first entity 25, the display element of the driver side mirror 406, driver side window 410, and/or driver side portion of the windshield 404A may be identified as the display element corresponding to the direction associated with the interaction. In an example embodiment, if the second entity 35 is approaching the first entity 5 from the driver side of the first entity 25, a speaker element located on the driver side door may be identified as the speaker element corresponding to the direction associated with the interaction.

At block 706, the provision of the countdown is caused via the display and/or speaker element(s) identified and/or determined to correspond to the direction associated with the interaction. For example, the first entity apparatus 20 and/or remote apparatus 10 may cause the countdown to be provided via the display and/or speaker element(s) identified and/or determined to correspond to the direction associated with the interaction. For example, the remote apparatus 10 and/or first entity apparatus 20 may respectively comprise means, such as processor 12, 22, memory 14, 24, communications interface 16, 26, user interface 28, and/or the like, for causing the countdown to be provided via the display and/or speaker element(s) identified and/or determined to corresponding to the direction associated with the interaction. For example, the process may cause the countdown (and possibly an associated transportation mode symbol) to be displayed and/or audibly provided via the display and/or speaker element(s) identified and/or determined to corresponding to the direction associated with the interaction, at block 510.

e. Providing Instructions to a Machine Operator

In various embodiments, the countdown is provided such that instructions for operating the first entity 25 may be generated and provided to a machine operator (e.g., an autonomous driving system and/or ADAS that may be part of the first entity apparatus 20) for execution thereby such that one or more systems of the first entity 25 are controlled in accordance with the instructions. For example, the instructions may cause a change in the speed of the first entity 25, a change in the heading of the first entity 25, and/or the like. FIG. 8 provides a flowchart illustrating various processes, procedures, operations, and/or the like for providing instructions for operating the first entity 25 to a machine operator of the first entity 25 based at least in part on a countdown. In various embodiments, the instructions may be generated based at least in part on multiple countdowns. For example, at block 510, the one or more countdowns may be provided as input to one or more navigation functions and/or as input to one or more instruction generating processes, programs, applications, and/or the like.

Starting at block 802, one or more countdowns may be provided and, optionally, one or more navigation functions may be performed based on the countdowns. For example, a maneuver to be performed by the first entity 25 to prevent and/or change the interaction(s) may be determined, a change in route which is expected to prevent and/or change the interaction(s) may be determined, and/or the like via the performance of the navigation function(s). For example, the first entity apparatus 20 and/or remote apparatus 10 may perform one or more navigation functions based at least in part on the one or more countdowns. For example, the remote apparatus 10 and/or first entity apparatus 20 may respectively comprise means, such as processor 12, 22, memory 14, 24, and/or the like, for performing one or more navigation functions based on the one or more countdowns.

At block 804, the instructions may be generated based at least in part on the one or more countdowns and/or the result(s) of the one or more navigation functions. For example, the instructions may be configured such that when executed by a machine user of the first entity 25 (e.g., an autonomous driving system and/or ADAS of the first entity 25) the machine user of the first entity 25 controls one or more systems of the first entity 25 in accordance with the instructions. In an example embodiment, the machine user is part of and/or executing on the first entity apparatus 20. In various embodiments, the instructions are configured such that when the first entity 25 is controlled in accordance with the instructions, at least one interaction corresponding to the one or more countdowns is prevented and/or changed. For example, the first entity apparatus 20 and/or remote apparatus 10 may generate instructions for execution by a machine user of the first entity 25 based at least in part on the one or more countdowns and/or result(s) of the one or more navigation functions. For example, the remote apparatus 10 and/or first entity apparatus 20 may respectively comprise means, such as processor 12, 22, memory 14, 24, and/or the like, for generating instructions for execution by a machine user of the first entity 25 based at least in part on the one or more countdowns and/or result(s) of the one or more navigation functions.

At block 806, the instructions are provided for execution by the machine user of the first entity 25. For example, the first entity apparatus 20 and/or remote apparatus 10 may provide the instructions generated at block 804 for execution by the machine user of the first entity 25. For example, the remote apparatus 10 and/or first entity apparatus 20 may comprise means, such as processor 12, 22, memory 14, 24, communications interface 16, 26, and/or the like, for providing the instructions generated at block 804 for execution by the machine user of the first entity 25. For example, the instructions may be provided such that the machine user is caused to execute (e.g., cause the processor 22 to execute) the instructions such that the first entity 25 is controlled in accordance with the instructions.

f. Modifying an Interaction Section

In various embodiments, map information/data of a digital map may be used to identify an interaction section. An interaction section is a geographic area (e.g., along a road segment and/or the like) where it is expected that an interaction between the first entity 25 and a second entity 35 will occur. In various embodiments, map information/data corresponding to and/or identifying an interaction section may be provided (e.g., displayed via a display element, such as in-vehicle display 414). In various embodiments, map information/data may be analyzed to determine if an interaction section should be modified. For example, if the interaction section includes sharp turns, blind corners, is near an intersection, an area experiencing dense fog or high pedestrian traffic, and/or the like, it may be determined that the interaction section should be modified. For example, interaction section modification instructions may be generated and provided. In an example embodiment, the interaction section modification instructions are computer executable instructions provided to a machine user of the first entity 25 (e.g., an automated driving system and/or ADAS of the first entity 25). In an example embodiment, the interaction section modification instructions are instructions that are provided to a human operator of the first entity 25 (e.g., via a display element and/or speaker element of the first entity 25).

FIG. 9 provides a flowchart illustrating various processes, procedures, and/or operations for providing interaction section information/data corresponding to an interaction section for an interaction that is expected to occur between a first entity 25 and a second entity 35. In an example embodiment, the interaction section information/data includes interaction section modification instructions. For example, the first entity 25 may be a vehicle traveling along a highway, for example, and the second entity 35 may be a vehicle that the first entity 25 is about to overtake and will need to pass or a vehicle that is about to overtake and/or pass the first entity 25.

Starting at block 902, map information/data is accessed. For example, the first entity apparatus 20 and/or the remote apparatus 10 may store map information/data (e.g., in a geographic database) in memory 14, 24. Map information/data corresponding to the geographic area in which the first entity 25 is located and/or in which the interaction section is expected to be located is accessed. For example, the first entity apparatus 20 and/or the remote apparatus 10 may access map information/data. For example, the remote apparatus 10 and/or the first entity apparatus 20 may comprise means, such as processor 12, 22, memory 14, 24, and/or the like, for accessing map information/data. In various embodiments, the map information/data comprises traversable map element (TME) records corresponding to a TME along which the first entity 25 is traveling and/or is expected to be traveling along during the interaction with the second entity 35. In various embodiments, a TME is representation of a road segment, lane segment, path segment, and/or other element of a traversable network that the first and second entities 25, 35 are traversing at least in part.

At block 904, the interaction section for the interaction is identified based at least in part on the map information/data. For example, a TME and/or a portion of a TME along which the interaction is expected to occur is identified based at least in part on the expected trajectory of the first entity 25 (e.g., based at least in part on the location, heading, and/or velocity of the first entity 25 and the geometry of the TME the first entity 25 is traveling along), the trajectory of the second entity 35 (e.g., based at least in part on the location, heading, and/or velocity of the second entity 35 and the geometry of the TME the second entity 35 is traveling along), and the map information/data. For example, the location along a beginning TME where the interaction is expected to begin may be identified. The beginning TME is the TME the first entity 25 is located on when the interaction is expected to begin. In an example embodiment, a time and/or distance duration of the interaction may be estimated (e.g., based on the expected trajectory of the first entity 25, the expected trajectory of the second entity 35, and/or the map information/data). For example, a location along an ending TME where the interaction is expected to be completed may be identified. The ending TME is the TME the first entity 25 is located on when the interaction is expected to be completed (e.g., the second entity 35 leaves the zone defined around the first entity 25). In various scenarios the beginning TME and the ending TME may be the same TME. In other scenarios, the beginning TME and the ending TME may be different TMEs. In an example embodiment, the interaction section is identified as the section of one or more TMEs between the location along the beginning TME where the interaction is expected to begin and the location along the ending TME where the interaction is expected to be completed.

In various embodiments, the interaction section may include confidence intervals corresponding to a particular confidence level of the location along the beginning TME where the interaction is expected to begin and/or the location along the ending TME where the interaction is expected to be completed. For example, the location along the beginning TME where the interaction is expected to begin may be identified as point A. A confidence interval of a particular confidence level extends to both sides of point A along the beginning TME. Similarly, the location along the ending TME where the interaction is expected to be completed may be identified as point B. A confidence interval of the particular confidence level extends to both sides of point B along the ending TME. In an example embodiment, the interaction section may be defined as the portion(s) of one or more TMEs located between point A and point B. In an example embodiment, the interaction section may be defined as the portion(s) of one or more TMEs located between the one end of the confidence interval about point A to one end of the confidence interval about point B. The ends of the confidence intervals about point A and point B may be selected so as to maximize the length of the interaction section.

At block 906, it is determined whether the interaction section should be modified. For example, the first entity apparatus 20 and/or remote apparatus 10 may determine whether the interaction section should be modified. For example, the remote apparatus 10 and/or first entity apparatus 20 may respectively comprise means, such as processor 12, 22, memory 14, 24, and/or the like, for determining whether the interaction section should be modified. In various embodiments, the determination of whether the interaction section should be modified may be determined based at least in part on the map information/data (e.g., geometry, traffic information/data, POIs located there along, and/or the like) corresponding to the beginning TME, ending TME, and any TMEs along which the interaction section extends (e.g., between the beginning TME and the ending TME). In various embodiments, the determination of whether the interaction section should be modified may be based at least in part on profile information/data associated with a profile corresponding to the first entity 25 and/or a human operator and/or passenger onboard the first entity 25, handling information/data corresponding to a handling system of the first entity 25, acceleration and/or braking information/data corresponding to acceleration and/or braking systems of the first entity 25, weather information/data corresponding to the interaction section, and/or the like.

When, at block 906, it is determined that the interaction should be modified, interaction section modification instructions are generated. In various embodiments, the intersection modification instructions may be generated based on identifying a preferred modified interaction section and determining changes in the operation of the first entity 25 that are necessary to cause the interaction section to be shifted to the preferred modified interaction section. In various embodiments, the modification instructions may be generated by simulating and/or modeling the result of making moderate and/or appropriate changes to the operation of the first entity 25 and determining whether the resulting modified interaction section is preferred over the interaction section. For example, a moderate and/or appropriate change in the operation of the first entity 25 may include changing the speed of the first entity 25 by five miles per hour, for example. Whereas changing the speed of the first entity 25 by twenty miles per hour may not be a moderate and/or appropriate change in the operation of the first entity 25. In various embodiments, what is interpreted as being a moderate and/or appropriate change in the operation of the first entity 25 may be determined based on the map information/data (e.g., speed limit, minimum speed, current traffic speeds, and/or the like) of the corresponding TMEs, profile information/data associated with a profile corresponding to the first entity and/or a human operator and/or passenger onboard the first entity 25, the functional class of the TME the first entity 25 is traveling along, and/or the like.

Once a change to the operation of the first entity 25 is determined to cause the interaction section to be shifted to a modified interaction section that is preferred over the interaction section, interaction section modification instructions for changing the operation of the first entity 25 are generated. For example, operation of the first entity 25 in accordance with the interaction section modification instructions are expected to cause the interaction section to be shifted to the modified interaction section. In an example embodiment, the interaction section modification instructions are computer executable instructions to be provided to a machine operator (e.g., autonomous driving system and/or ADAS of the first entity 25) for execution thereby (e.g., by processor 22) such that the first entity 25 is operated in accordance with the interaction section modification instructions. In an example embodiment, the interaction section modification instructions are human language instructions to be provided to a human operator of the first entity 25 (e.g., via display element and/or speaker element of the first entity 25).

For example, a first entity apparatus 20 and/or a remote apparatus 10 may generate interaction section modification instructions, at block 908. For example, the remote apparatus 10 and/or first entity apparatus 20 may respectively comprise means, such as processor 12, 22, memory 14, 24, and/or the like for generating interaction section modification instructions.

At block 910, interaction section information/data is provided. For example, the interaction section information/data may be provided to a human operator and/or passenger onboard the first entity 25 and/or a machine operator (e.g., autonomous driving system and/or ADAS) of the first entity 25. In various embodiments, when it was determined at block 906 that the interaction section should be modified, the interaction section information/data comprises the interaction section modification instructions. For example, the first entity apparatus 20 and/or remote apparatus 10 may comprise means for providing the interaction section information/data. For example, the remote apparatus 10 and/or first entity apparatus 20 may respectively comprise means, such as processor 12, 22, memory 14, 24, communications interface 16, 26, user interface 28, and/or the like for providing the interaction section information/data. For example, when the interaction information/data comprises interaction section modification instructions that are computer executable instructions, at last a portion of the interaction information/data (e.g., the interaction section modification instructions) are provided to a machine user of the first entity 25 such that the first entity 25 may be operated in accordance with the interaction section modification instructions. For example, when the interaction information/data comprises interaction section modification instructions that are configured to be provided to a human operator of the first entity 25, the interaction section modification instructions may be provided via a display element and/or speaker element of the first entity 25.

FIG. 10 illustrates an example interaction section view 1000 displayed via an in-vehicle display 414 and displaying at least a portion of interaction section information/data. For example, the interaction section view 1000 includes a map layer 1002 that provides a graphical representation of at least a portion of the map information/data. For example, the map layer 1002 may provide a graphical representation of one or more TMEs (e.g., the beginning TME, ending TME, any TMEs located therebetween, one or more TMEs prior to the beginning TME on the expected trajectory of the first entity 25, one or more TMEs after the ending TME on the expected trajectory of the first entity 25, and/or the like). In various embodiments, the interaction section view 1000 comprises an interaction section indicator 1004, as indicated by the dashed lines. In various embodiments, the interaction section view 1000 comprises a modified interaction section indicator 1006, as indicated by the dotted lines. The interaction section view 1000 may further include interaction section modification instructions 1008. For example, a human operator may view the interaction section view 1000, efficiently determine, based on the interaction section indicator 1004 and a corresponding portion of the map layer 1002, that the interaction section should be modified and efficiently determine, based on the interaction section modification instructions, how to modify the operation of the first entity 25 to shift the interaction section to the modified interaction section.

Technical Advantages

Various embodiments provide a technical solution to the technical problem of preventing and/or changing interactions between first entities and second entities along a traversable network. For example, various embodiments efficiently and effectively provide a human operator of a first entity a countdown until an interaction between a first entity and a second entity is expected to occur, an indication of a direction from which the second entity is approaching the first entity (and/or is being approached by the first entity), and/or a transportation mode of the second entity. The human operator may then efficiently take action to prevent and/or change the interaction. For example, various embodiments provide timing information/data regarding an expected interaction. The timing information/data may be helpful in determining the most effective changes to the operation of the first entity 25 to prevent and/or change the interaction and/or how to maneuver through/around multiple expected interactions. The positioning of the display of the timing information/data (e.g., a countdown) intuitively provides the human operator with an indication of the direction from which the second entity is approaching, thereby enabling the human operator of the first entity 25 to respond more efficiently to the countdown. Various embodiments further provide improvements to the operation of autonomous driving systems and/or ADAS through the provision of timing information/data regarding expected interactions such that operating instructions may be effectively generated for controlling the first entity 25 to prevent and/or change an interaction. Thus, various embodiments provide technical improvements to the art of providing a human operator of a first entity with a notification regarding an expected interaction by providing a countdown to the expected beginning of the interaction in an intuitive manner and providing instructions to a machine operator of a first entity to prevent and/or change interactions. Thus, various embodiments provide technical improvements that address problems that arise specifically within the corresponding art.

III. Example Apparatus

The remote apparatus 10, first entity apparatus 20, and/or second entity apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the remote apparatus 10, first entity apparatus 20, and/or second entity apparatus 30 may be embodied in other types of computing devices, such as a server, a personal computer, a computer workstation, a laptop computer, a plurality of networked computing devices or the like, that are configured to update one or more map tiles, analyze probe information/data for route planning or other purposes, generate, determine, store, and/or provide traffic and/or map information/data (e.g., including driving condition information/data, in an example embodiment), and/or the like. In an example embodiment, a first entity apparatus 20 and/or second entity apparatus 30 is an in-vehicle navigation system onboard a respective first entity 25 or second entity 30 or a mobile device and a remote apparatus 10 is a server. In an example embodiment, a first entity apparatus 20 is an apparatus configured to capture sensor information/data via one or more sensors onboard the corresponding first entity 25 and either provide the sensor information/data or use the sensor information/data to generate countdowns corresponding to the expected beginnings of expected interactions of the first entity 25 with one or more second entities 35. In this regard, FIG. 2A depicts an example remote apparatus 10 and FIG. 2B depicts an example first entity apparatus 20 that may be embodied by various computing devices including those identified above. As shown, the remote apparatus 10 of an example embodiment may include, may be associated with, or may otherwise be in communication with a processor 12 and a memory device 14 and optionally a communication interface 16 and/or a user interface 18. Similarly, a first entity apparatus 20 of an example embodiment may include, may be associated with, or may otherwise be in communication with a processor 22 and a memory device 24, and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the first entity apparatus to determine a location of the first entity 25 and/or one or more features of the first entity's 25 surroundings), and/or other components configured to perform various operations, procedures, functions, or the like described herein. In an example embodiment, a second entity apparatus 30 of an example embodiment may include, may be associated with, or may otherwise be in communication with a processor and a memory device and optionally a communication interface, a user interface, one or more sensors (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the second entity apparatus to determine a location of the second entity 35, and/or other components configured to perform various operations, procedures, functions, or the like described herein.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

As described above, the remote apparatus 10, first entity apparatus 20, and/or second entity apparatus 30 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10, first entity apparatus 20, and/or second entity apparatus 30 may include a user interface 18, 28 that may, in turn, be in communication with the processor 12, 22 to provide output to the user, such as one or more countdowns, one or more routes through a road network, a notification that a vehicle is approaching a human operator assistance portion of a route, and/or the output of one or more other navigation functions, and, in some embodiments, to receive an indication of a user input. As such, the user interface may include one or more output elements/devices such as one or more display elements, speaker elements, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The remote apparatus 10, first entity apparatus 20, and/or second entity apparatus 30 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10, first entity apparatus 20, and/or second entity apparatus 30 of an example embodiment, a navigation system may also include or have access to a geographic database. For example, in various embodiments, a remote apparatus 10, first entity apparatus 20, and/or second entity apparatus 30 may comprise a component (e.g., memory 14, 24, and/or another component) that stores a digital map (e.g., in the form of a geographic database) comprising a first plurality of data records, each of the first plurality of data records representing a corresponding traversable map element (TME), wherein at least some of said first plurality of data records include traffic and/or map information/data corresponding to the TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, link, or TME data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, TME data records, POI data records, and/or other data records. In an example embodiment, the remote apparatus 10 may be configured to modify, update, and/or the like one or more data records of the geographic database. For example, the remote apparatus 10 may modify, update, generate, and/or the like traffic and/or map information/data corresponding to TMEs, links, lanes, road segments, travel lanes of road segments, nodes, intersection, and/or the like and/or the corresponding data records (e.g., to add or update a corresponding sensor quality index table), a localization layer (e.g., comprising localization features) and/or the corresponding data records, and/or the like.

In an example embodiment, the TME data records are links, lanes, or segments (e.g., maneuvers of a maneuver graph) representing roads, travel lanes of roads, streets, or paths, as can be used in the calculated route or recorded route information for determination of one or more personalized routes. The intersection data records are end points corresponding to the respective links, segments, or TMEs of the road segment data records. The TME data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The TMEs, road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an analysis apparatus 10, probe apparatus 20, and/or consumer apparatus 30 in accordance with an example embodiment may determine the time to traverse a route that includes one or more turns at respective intersections more accurately.

IV. Apparatus, Methods, and Computer Program Products

As described above, FIGS. 3 and 5-9 illustrate flowcharts of a first entity apparatus 20 and/or a remote apparatus 10, methods, and computer program products according to an example embodiment of the disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present disclosure and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving, by a processor of an apparatus, sensor data associated with at least a first entity, the sensor data corresponding to at least one of a location of the first entity or surroundings of the first entity;
    identifying, by the processor and based at least in part on the sensor data, at least one second entity, wherein, based at least in part on a first trajectory along which the first entity is traveling and a second trajectory along which the at least one second entity is traveling, it is expected that the at least one second entity will enter a zone defined around the first entity;
    determining, by the processor and based at least in part on the sensor data, an amount of time until the at least one second entity will enter the zone defined around the first entity;
    responsive to determining that the amount of time until the at least one second entity will enter the zone satisfies a time threshold requirement, providing, by the processor, the amount of time until the at least one second entity will enter the zone as at least one of (a) input to a navigation function or (b) to be displayed as a countdown via a display element and/or speaker element of the first entity; and
    responsive to determining that the amount of time until the at least one second entity will enter the zone does not satisfy the time threshold requirement, not providing the amount of time until the at least one second entity will enter the zone.

2. The method of claim 1, further comprising:
identifying a transportation mode associated with the at least one second entity;
determining, based on profile information associated with at least one of the first entity or a human operator or passenger onboard the first entity, whether a countdown is to be displayed for second entities of the transportation mode; and
responsive to determining that the countdown is to be displayed, causing the countdown to be displayed.

3. The method of claim 1, further comprising:
identifying a transportation mode associated with the at least one second entity; and causing a transportation mode symbol indicating the transportation mode to be displayed in association with the countdown.

4. The method of claim 1, further comprising identifying the display element and/or speaker element of the first entity based on at least one of (a) a location of the at least one second entity with respect to the first entity or (b) profile information associated with at least one of the first entity or a human operator or passenger onboard the first entity.

5. The method of claim 1, wherein the display element is one of a rear view mirror of the first entity, a driver's side mirror of the first entity, a passenger side mirror of the first entity, a windshield of the first entity, an in-vehicle display of the first entity, a dashboard display element of the first entity, a wearable heads up display worn by a human operator or passenger onboard the first entity.

6. The method of claim 1, further comprising:
updating the amount of time until the at least one second entity will enter the zone based at least in part on additional sensor data, the additional sensor data corresponding to an updated location of the first entity or updated surroundings of the first entity; and
providing the updated amount of time until the at least one second entity will enter the zone.

7. The method of claim 1, wherein the at least one second entity comprises two or more second entities and a number of countdowns provided via one or more display elements and/or speak elements of the first entity is determined based on profile information associated with at least one of the first entity or a human operator or passenger onboard the first entity, each countdown of the number of countdowns corresponding to one second entity of the two or more second entities.

8. The method of claim 7, wherein the number of countdowns provided correspond to second entities of the two or more second entities having shortest times until the second entity enters the zone.

9. The method of claim 8, further comprising:
identifying a transportation mode associated with each of the two or more second entities;
determining, based on profile information associated with at least one of the first entity or a human operator or passenger onboard the first entity, whether each second entity of the two or more second entities are eligible for a countdown based on the corresponding transportation mode; and
providing the amount of time until the second entity enters the zone for a number of second entities that are eligible for a countdown that have shortest times until the second entity enters the zone.

10. The method of claim 1, further comprising determining whether the time until the at least one second entity enters the zone satisfies a time threshold requirement, wherein the time threshold requirement is determined based at least in part on a mode of transportation associated with the at least one second entity.

11. The method of claim 1, wherein a result of the navigation function comprises instructions for an automated driver assistance system or an automated driving system.

12. The method of claim 1, further comprising based at least in part on map data and the time until the at least one second entity enters the zone, determining an interaction section of at least portions of one or more traversable map elements path along which it is expected that the at least one second entity will enter the zone.

13. The method of claim 12, further comprising, based on map data corresponding to the interaction section, determining whether to modify the operation of the first entity so that the at least one second entity enters the zone in a modified interaction zone.

14. The method of claim 13, further comprising generating and providing or causing the providing of interaction section modification instructions, wherein operation of the first entity in accordance with the interaction section modification instructions is expected to cause the at least one second entity to enter the zone in the modified interaction zone.

15. An apparatus comprising at least one processor and at least one memory storing computer program code, the at least one memory and the computer program code configured to, with the processor, cause the apparatus to at least:
receive sensor data associated with at least a first entity, the sensor data corresponding to at least one of a location of the first entity or surroundings of the first entity;
identify, based at least in part on the sensor data, at least one second entity, wherein, based at least in part on a first trajectory along which the first entity is traveling and a second trajectory along which the at least one second entity is traveling, it is expected that the at least one second entity will enter a zone defined around the first entity;
determine, based at least in part on the sensor data, an amount of time until the at least one second entity will enter the zone defined around the first entity;
responsive to determining that the amount of time until the at least one second entity will enter the zone satisfies a time threshold requirement, provide the amount of time until the at least one second entity will enter the zone as at least one of (a) input to a navigation function or (b) to be displayed as a countdown via a display element and/or speaker element of the first entity; and
responsive to determining that the amount of time until the at least one second entity will enter the zone does not satisfy the time threshold requirement, not providing the amount of time until the at least one second entity will enter the zone.

16. The apparatus of claim 15, wherein the at least one memory and the computer program code are further configured to, with the processor, cause the apparatus to at least:
identify a transportation mode associated with the at least one second entity;
determine, based on profile information associated with at least one of the first entity or a human operator or passenger onboard the first entity, whether a countdown is to be displayed for second entities of the transportation mode; and
responsive to determining that the countdown is to be displayed, cause the countdown to be displayed.

17. The apparatus of claim 15, wherein the at least one memory and the computer program code are further configured to, with the processor, cause the apparatus to at least:
- identify a transportation mode associated with the at least one second entity; and
- cause a transportation mode symbol indicating the transportation mode to be displayed in association with the countdown.

18. The apparatus of claim 15, wherein the at least one memory and the computer program code are further configured to, with the processor, cause the apparatus to at least identify the display element and/or speaker element of the first entity based on at least one of (a) a location of the at least one second entity with respect to the first entity or (b) profile information associated with at least one of the first entity or a human operator or passenger onboard the first entity.

19. The apparatus of claim 15, wherein a result of the navigation function comprises instructions for an automated driver assistance system or an automated driving system.

20. The apparatus of claim 15, wherein the at least one memory and the computer program code are further configured to, with the processor, cause the apparatus to at least, based at least in part on map data and the time until the at least one second entity enters the zone, determining an interaction section of at least portions of one or more traversable map elements path along which it is expected that the at least one second entity will enter the zone.

* * * * *